US008661216B2

(12) United States Patent
Kavuri et al.

(10) Patent No.: US 8,661,216 B2
(45) Date of Patent: *Feb. 25, 2014

(54) SYSTEMS AND METHODS FOR MIGRATING COMPONENTS IN A HIERARCHICAL STORAGE NETWORK

(75) Inventors: Srinivas Kavuri, South Plainfield, NJ (US); Marcus Muller, Tinton Falls, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 636 days.

This patent is subject to a terminal disclaimer.

(21) Appl. No.: 11/639,808

(22) Filed: Dec. 15, 2006

(65) Prior Publication Data

US 2007/0198797 A1   Aug. 23, 2007

Related U.S. Application Data

(60) Provisional application No. 60/752,196, filed on Dec. 19, 2005, provisional application No. 60/752,198, filed on Dec. 19, 2005, provisional application No. 60/752,202, filed on Dec. 19, 2005, provisional application No. 60/752,201, filed on Dec. 19, 2005, provisional application No. 60/752,197, filed on Dec. 19, 2005, provisional application No. 60/752,203, filed on Dec. 19, 2005.

(51) Int. Cl.
*G06F 12/00* (2006.01)
*G06F 13/00* (2006.01)
*G06F 13/28* (2006.01)

(52) U.S. Cl.
USPC .......................................... 711/165; 711/170

(58) Field of Classification Search
USPC .................................................. 711/165, 170
See application file for complete search history.

(56) References Cited

U.S. PATENT DOCUMENTS 4,686,620 A    8/1987  Ng
4,995,035 A    2/1991  Cole et al.
(Continued)

FOREIGN PATENT DOCUMENTS

EP    0 259 912    3/1988
EP    0 405 926    1/1991
(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner* — Sheng-Jen Tsai
(74) *Attorney, Agent, or Firm* — Knobbe, Martens, Olson & Bear, LLP

(57) ABSTRACT

System and methods for selectively or automatically migrating resources between storage operation cells are provided. In accordance with one aspect of the invention, a management component within the storage operation system may monitor system operation and migrate components from storage operation cell to another to facilitate failover recovery, promote load balancing within the system and improve overall system performance as further described herein. Another aspect of the invention may involve performing certain predictive analyses on system operation to reveal trends and tendencies within the system. Such information may be used as the basis for potentially migrating components from one storage operation cell to another to improve system performance and reduce or eliminate resource exhaustion or congestion conditions.

24 Claims, 7 Drawing Sheets

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,058,066 A | 5/2000 | Norris et al. |
| 6,076,148 A | 6/2000 | Kedem |
| 6,088,697 A | 7/2000 | Crockett et al. |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,068 B1 * | 7/2001 | Zalewski et al. ............ 709/226 |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,595 B1 | 8/2002 | Blumenau et al. |
| 6,466,950 B1 | 10/2002 | Ono |
| 6,487,561 B1 | 11/2002 | Ofek et al. |
| 6,516,314 B1 | 2/2003 | Birkler et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,542,468 B1 | 4/2003 | Hatakeyama |
| 6,542,972 B2 | 4/2003 | Ignatius |
| 6,564,228 B1 | 5/2003 | O'Connor |
| 6,587,970 B1 | 7/2003 | Wang et al. |
| 6,604,118 B2 | 8/2003 | Kleinman et al. |
| 6,611,849 B1 | 8/2003 | Raff et al. |
| 6,629,189 B1 | 9/2003 | Sandstrom |
| 6,643,801 B1 | 11/2003 | Jammu et al. |
| 6,658,436 B2 | 12/2003 | Oshinsky et al. |
| 6,691,209 B1 | 2/2004 | O'Connell |
| 6,732,124 B1 | 5/2004 | Koseki et al. |
| 6,771,595 B1 | 8/2004 | Gilbert et al. |
| 6,792,472 B1 | 9/2004 | Otterness et al. |
| 6,820,035 B1 * | 11/2004 | Zahavi ............................ 702/182 |
| 6,839,724 B2 | 1/2005 | Manchanda et al. |
| 6,925,476 B1 | 8/2005 | Multer et al. |
| 7,035,880 B1 | 4/2006 | Crescenti et al. |
| 7,065,615 B2 | 6/2006 | Sugino et al. |
| 7,068,597 B1 | 6/2006 | Fijolek et al. |
| 7,082,441 B1 | 7/2006 | Zahavi et al. |
| 7,085,904 B2 | 8/2006 | Mizuno et al. |
| 7,093,012 B2 | 8/2006 | Olstad et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,740 B1 | 9/2006 | Colgrove et al. |
| 7,106,691 B1 | 9/2006 | Decaluwe et al. |
| 7,120,757 B2 | 10/2006 | Tsuge |
| 7,130,970 B2 | 10/2006 | Devassy et al. |
| 7,146,377 B2 | 12/2006 | Nowicki et al. |
| 7,158,985 B1 | 1/2007 | Liskov |
| 7,197,490 B1 | 3/2007 | English |
| 7,203,944 B1 | 4/2007 | van Rietschote et al. |
| 7,216,244 B2 | 5/2007 | Amano |
| 7,231,391 B2 | 6/2007 | Aronoff |
| 7,340,652 B2 | 3/2008 | Jarvis et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,395,282 B1 | 7/2008 | Crescenti et al. |
| 7,401,064 B1 | 7/2008 | Arone et al. |
| 7,454,569 B2 | 11/2008 | Kavuri et al. |
| 7,461,101 B2 | 12/2008 | Hsu et al. |
| 7,461,230 B1 | 12/2008 | Gupta et al. |
| 7,469,262 B2 | 12/2008 | Baskaran et al. |
| 7,472,312 B2 | 12/2008 | Jarvis et al. |
| 7,490,207 B2 * | 2/2009 | Amarendran et al. ......... 711/165 |
| 7,502,902 B2 * | 3/2009 | Sato et al. .................... 711/161 |
| 7,529,745 B2 | 5/2009 | Ahluwalia et al. |
| 7,533,181 B2 | 5/2009 | Dawson et al. |
| 7,546,364 B2 | 6/2009 | Raman et al. |
| 7,617,262 B2 | 11/2009 | Prahlad et al. |
| 7,617,321 B2 | 11/2009 | Clark |
| 7,644,245 B2 | 1/2010 | Prahlad et al. |
| 7,765,167 B2 | 7/2010 | Prahlad et al. |
| 7,831,566 B2 * | 11/2010 | Kavuri et al. ................. 707/651 |
| 7,904,681 B1 | 3/2011 | Bappe |
| 8,112,605 B2 | 2/2012 | Kavuri |
| 8,266,406 B2 | 9/2012 | Kavuri |
| 8,306,926 B2 * | 11/2012 | Prahlad et al. ................ 705/400 |
| 2002/0004883 A1 | 1/2002 | Nguyen et al. |
| 2002/0019909 A1 | 2/2002 | D'Errico |
| 2002/0120741 A1 | 8/2002 | Webb et al. |
| 2002/0124137 A1 * | 9/2002 | Ulrich et al. .................. 711/113 |
| 2002/0143999 A1 | 10/2002 | Yamagami |
| 2002/0181395 A1 | 12/2002 | Foster et al. |
| 2003/0005119 A1 | 1/2003 | Mercier et al. |
| 2003/0023743 A1 | 1/2003 | Raphel et al. |
| 2003/0023893 A1 | 1/2003 | Lee et al. |
| 2003/0065759 A1 | 4/2003 | Britt et al. |
| 2003/0079018 A1 | 4/2003 | Lolayekar et al. |
| 2003/0126200 A1 | 7/2003 | Wolff |
| 2003/0161338 A1 | 8/2003 | Ng et al. |

(56) References Cited

U.S. PATENT DOCUMENTS

| | | |
|---|---|---|
| 2003/0163652 A1 | 8/2003 | Tsuge |
| 2004/0006572 A1 | 1/2004 | Hoshino et al. |
| 2004/0006578 A1 | 1/2004 | Yu |
| 2004/0078632 A1 | 4/2004 | Infante et al. |
| 2004/0117438 A1 | 6/2004 | Considine et al. |
| 2004/0133634 A1 | 7/2004 | Luke |
| 2004/0193625 A1 | 9/2004 | Sutoh |
| 2004/0225437 A1 | 11/2004 | Endo et al. |
| 2005/0060613 A1 | 3/2005 | Cheng |
| 2005/0172073 A1 | 8/2005 | Voigt |
| 2005/0188109 A1 | 8/2005 | Shiga et al. |
| 2005/0228875 A1 | 10/2005 | Monitzer et al. |
| 2005/0246376 A1 | 11/2005 | Lu et al. |
| 2005/0254456 A1 | 11/2005 | Sakai |
| 2006/0010341 A1 | 1/2006 | Kodama |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0171315 A1 | 8/2006 | Choi et al. |
| 2006/0174075 A1 | 8/2006 | Sutoh |
| 2006/0206662 A1 | 9/2006 | Ludwig et al. |
| 2006/0215564 A1 | 9/2006 | Breitgand et al. |
| 2007/0033368 A1* | 2/2007 | Taguchi et al. ............ 711/170 |
| 2007/0033437 A1 | 2/2007 | Kawamura |
| 2007/0050547 A1 | 3/2007 | Sano |
| 2007/0055737 A1 | 3/2007 | Yamashita et al. |
| 2007/0088702 A1 | 4/2007 | Fridella et al. |
| 2007/0130373 A1 | 6/2007 | Kalwitz |
| 2007/0185939 A1 | 8/2007 | Prahland et al. |
| 2007/0198802 A1 | 8/2007 | Kavuri |
| 2007/0260609 A1 | 11/2007 | Tulyani |
| 2007/0260834 A1 | 11/2007 | Kavuri et al. |
| 2008/0059704 A1 | 3/2008 | Kavuri |
| 2008/0114815 A1 | 5/2008 | Sutoh |
| 2008/0126704 A1 | 5/2008 | Ulrich et al. |
| 2008/0147878 A1 | 6/2008 | Kottomtharayil et al. |
| 2008/0177970 A1 | 7/2008 | Prahlad et al. |
| 2008/0177971 A1 | 7/2008 | Prahlad et al. |
| 2008/0205301 A1 | 8/2008 | Burton et al. |
| 2008/0228987 A1 | 9/2008 | Yagi |
| 2008/0250178 A1 | 10/2008 | Haustein et al. |
| 2008/0313497 A1 | 12/2008 | Hirakawa |
| 2009/0013014 A1 | 1/2009 | Kern |
| 2009/0089499 A1 | 4/2009 | Abe |
| 2009/0113056 A1* | 4/2009 | Tameshige et al. ........ 709/226 |
| 2009/0300412 A1 | 12/2009 | Soran et al. |
| 2010/0005151 A1* | 1/2010 | Gokhale ................ 709/216 |
| 2010/0070726 A1* | 3/2010 | Ngo et al. ................ 711/162 |
| 2010/0293112 A1* | 11/2010 | Prahlad et al. ............ 705/418 |
| 2010/0312979 A1 | 12/2010 | Kavuri et al. |
| 2011/0010518 A1 | 1/2011 | Kavuri et al. |
| 2013/0007402 A1 | 1/2013 | Prahlad et al. |
| 2013/0124734 A1 | 5/2013 | Kavuri |

FOREIGN PATENT DOCUMENTS

| | | |
|---|---|---|
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| WO | 95/13580 | 5/1995 |
| WO | 99/12098 | 3/1999 |

OTHER PUBLICATIONS

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press, vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and the recitation in claim 5).

European Examination Report Application No. 05745272.4, Mar. 9, 2010.

International Search Report, PCT/US2005/015202, dated Dec. 5, 2006.

Supplementary European Search Report, EP 05745272.2, dated Mar. 16, 2010, 3 pages.

Office Action in Canadian Application No. 2,564,967 dated Aug. 8, 2012.

U.S. Appl. No. 13/606,371, filed Sep. 7, 2012, Kavuri, (and its file history).

\* cited by examiner

SYSTEMS AND METHODS FOR MIGRATING COMPONENTS IN A HIERARCHICAL STORAGE NETWORK

RELATED APPLICATIONS

This application claims the benefit of Provisional Application No. 60/752,196, filed Dec. 19, 2005 which is incorporated herein by reference.

This application is related to the following patents and pending applications, each of which is hereby incorporated herein by reference in its entirety:

application Ser. No. 09/354,058, titled HIERARCHICAL BACKUP AND RETRIEVAL SYSTEM, filed Jul. 15, 1999, now U.S. Pat. No. 7,395,282, issued Jan. 25, 2011;

U.S. Pat. No. 6,418,478, titled PIPELINED HIGH SPEED DATA TRANSFER MECHANISM, issued Jul. 9, 2002;

application Ser. No. 10/818,749, titled SYSTEM AND METHOD FOR DYNAMICALLY PERFORMING STORAGE OPERATIONS IN A COMPUTER NETWORK, filed Apr. 5, 2004, now U.S. Pat. No. 7,246,207, issued Jul. 17, 2007;

application Ser. No. 10/877,831, titled HIERARCHICAL SYSTEM AND METHOD FOR PERFORMING STORAGE OPERATIONS IN A COMPUTER NETWORK, filed Jun. 25, 2004, now U.S. Pat. No. 7,454,569, issued Nov. 18, 2008;

application Ser. No. 10/990,357, SYSTEM AND METHOD FOR COMBINING DATA STREAMS IN PIPELINED STORAGE OPERATIONS IN A STORAGE NETWORK, filed Nov. 15, 2004, now U.S. Pat. No. 7,315,923, issued Jan. 1, 2008;

application Ser. No. 11/120,619, titled HIERARCHICAL SYSTEMS AND METHODS FOR PROVIDING STORAGE A UNIFIED VIEW OF STORAGE INFORMATION, filed May 2, 2005, now U.S. Pat. No. 7,343,453, issued Mar. 11, 2008;

application Ser. No. 11/269,513, titled SYSTEM AND METHOD FOR MONITORING A STORAGE NETWORK, filed Nov. 7, 2005.

Application Ser. No. 60/752,203, titled SYSTEMS AND METHODS FOR CLASSIFYING AND TRANSFERRING INFORMATION IN A STORAGE NETWORK, filed Dec. 19, 2005;

Application Ser. No. 60/752,198, SYSTEMS AND METHODS FOR GRANULAR RESOURCE MANAGEMENT IN A STORAGE NETWORK, filed Dec. 19, 2005;

application Ser. No. 11/313,224, titled SYSTEMS AND METHODS FOR PERFORMING MULTI-PATH STORAGE OPERATIONS filed Dec. 19, 2005;

Application Ser. No. 60/752,202, SYSTEMS AND METHODS FOR UNIFIED RECONSTRUCTION OF DATA IN A STORAGE NETWORK filed Dec. 19, 2005;

Application Ser. No. 60/752,201, SYSTEMS AND METHODS FOR RESYNCHRONIZING STORAGE OPERATIONS filed Dec. 19, 2005; and Application Ser. No. 60/752,197, SYSTEMS AND METHODS FOR HIERARCHICAL CLIENT GROUP MANAGEMENT filed Dec. 19, 2005.

BACKGROUND OF THE INVENTION

The invention disclosed herein relates generally to performing storage operations on electronic data in a computer network. More particularly, the present invention relates to migrating resources used in performing storage operations from one storage operation cell to another.

Storage management systems have evolved over time into complex entities with many components including hardware and software modules designed to perform a variety of different storage operations on electronic data. Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data which is used by a software application and is typically in the native format of that application. Primary copy data may be maintained in a local memory or other high-speed storage device that allows for relatively fast data access. Such primary copy data is typically retained for a period of time (e.g., a number of seconds, minutes, hours or days) before some or all of the data is stored as one or more secondary copies, for example, to prevent loss of data in the event a problem occurs with the data stored in primary storage.

Secondary copies may include point-in-time data and may be intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is copied to secondary storage, a pointer or other location indicia such as a stub may be placed in the primary copy to indicate the current location of that data.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

Another form of secondary copy is a snapshot copy. From an end-user viewpoint, a snapshot may be thought of as a representation or image of the primary copy data at a given point in time. A snapshot generally creates a bit map or block level representation of a primary copy volume at a particular moment in time. Users typically gain a read-only access to the record of files and directories of the snapshot. By electing to restore primary copy data from a snapshot taken at a given point in time, users may also return the current file system to the prior state of the file system that existed when the snapshot was taken.

A snapshot may be created instantly, using a minimum of file space, but may still function as a conventional file system backup. A snapshot may not actually create another physical copy of all the data, but may simply create pointers that are mapped to specific blocks of data taken at the point in time of the snapshot.

In some conventional systems, once a snapshot has been taken, the original blocks in use at the time at snapshot are preserved in a cache such that only subsequent changes to the file system would overwrite them. Therefore, the initial snapshot may use only a small amount of disk space needed to record a mapping or other data structure representing or otherwise tracking the blocks that correspond to the current state of the volume (e.g., a bit map). Additional disk space is usually only required when files are actually modified later.

Furthermore, when files are modified, typically only the pointers which map to blocks are copied, not the blocks themselves. In some systems, for example in the case of copy-on-write snapshots, when a block changes in primary storage, the block is copied to secondary storage before the block is overwritten in primary storage and the snapshot mapping of file system data is updated to reflect the changed block(s) at that particular point in time.

A Hierarchical Storage Management ("HSM") copy is generally a copy of the primary copy data, but typically includes only a subset of the primary copy data that meets a certain criteria and is usually stored in a format other than the native application format. For example, an HSM copy might include only that data from the primary copy that is larger than a given size threshold or older than a given age threshold and that is stored in a backup format. Often, HSM data is removed from the primary copy, and a stub is stored in the primary copy to indicate its new location. When a user subsequently requests access to the HSM data that has been removed or migrated, systems then use the stub to locate the data and often make recovery of the data appear transparent, even though the HSM data may be stored at a location different from the remaining primary copy data.

An archive copy is generally similar to an HSM copy, however, the data satisfying criteria for removal from the primary copy is generally completely removed with no stub left in the primary copy to indicate the new location (i.e., where it has been moved to). Archive copies of data are generally stored in a backup format or other non-native application format. In addition, archive copies are generally retained for very long periods of time (e.g., years) and in some cases are never deleted. Such archive copies may be made and kept for extended periods in order to meet compliance regulations or for other permanent storage applications.

In some systems, data may be moved over its lifetime moves from expensive quick access storage, to less expensive slower access storage. This process of moving data through these various tiers of storage is sometimes referred to as information lifecycle management ("ILM"). This is the process by which data is "aged" from more expensive forms of secondary storage with faster access/restore times down through less expensive secondary storage with slower access/restore times, for example, as the data becomes less important or mission critical over time.

Examples of various types of data and copies of data are further described in the above-referenced related applications that are hereby incorporated by reference in their entirety. One example of a system that performs storage operations on electronic data that produce such copies is the QINETIX storage management system by COMMVAULT Systems of Oceanport, N.J.

The QINETIX system provides a modular storage management architecture that may include, among other things, storage manager components, client or data agent components, and media agent components as further described in U.S. patent application Ser. No. 10/818,749 which is hereby incorporated herein by reference in its entirety.

The QINETIX system also provides for hierarchically configuring storage operation cells to perform certain other types of storage operations including snapshot copies, HSM copies, archive copies, and certain other types of copies of electronic data, as further described in U.S. patent application Ser. No. 11/120,619 which is hereby incorporated herein by reference in its entirety.

The QINETIX system, as further disclosed in U.S. patent application Ser. No. 11/120,619, also provides for meaningful integration between and among HSM systems and Storage Resource Management ("SRM") systems. SRM systems are typically concerned with monitoring the health, status, and other information associated with primary copies of data (e.g., live or production line copies). For example, an SRM application may monitor the capacity of a volume storing a primary copy of data, and the rate of data transfer relative to the available storage of that volume. In contrast, HSM systems are typically concerned with data transport to secondary storage, such as the parameters and particulars associated with the storage and migration of secondary copy data as opposed to monitoring of information associated with primary copy data. HSM systems are thus generally directed to secondary copies and other archival data volumes. For example, an HSM system may be directed to migrating or otherwise transferring data to a secondary copy.

Transferring data to any one of the aforementioned secondary copy types may be performed using a storage management system, using one or more copy devices, components or other data transfer resources. Depending on storage requirements, secondary copy operations or other storage operations may be performed at various times which may result in an undesirably high number of storage operations being performed at a particular time using the same or similar resources. Meanwhile, other secondary copy resources may be underutilized.

In some instances, it may be desirable to migrate or reassign storage resources from one storage operation system, or subset of a system, such as a cell, to another to provide additional routing options or to help alleviate any bottlenecks or congestion that may occur based on established commitments or system configuration.

There are also situations where storage resources may be physically moved, and certain storage management components should be migrated to new places in the system to continue to support the moved storage resources.

Moreover, in certain situations, component migration, reallocation or movement, may be desired or necessary, such as in a disaster recovery (DR) situation where data and/or resources are temporarily or permanently moved to another storage operation cell.

SUMMARY OF THE INVENTION

Aspects of the present invention are directed towards systems and methods for selectively or automatically migrating storage system resources between various storage operation cells. In accordance with one aspect of the invention, a management component within the storage operation system may monitor system operation and migrate components from storage operation cell to another to facilitate failover recovery, promote load balancing within the system and improve overall system performance as further described herein. Another aspect of the invention may involve performing certain predictive analyses on system operation to identify trends and/or tendencies within the system. Such information may be used as the basis for potentially migrating components from one storage operation cell to another to improve system performance and reduce or eliminate resource exhaustion or congestion conditions.

In one illustrative embodiment of the invention, a method for automatically transferring a resource from a first storage operation cell to a second storage operation cell is provided. The method includes monitoring a first operational characteristic of a first resource in the first storage operation cell wherein the first operational characteristic has an associated first threshold; identifying a second storage operation cell including a second resource having a second operational characteristic that does not exceed a second threshold; determining whether the first resource may be transferred to the second storage operation cell such that the transfer is capable of causing the first operational characteristic to remain within the first threshold; and automatically transferring the first resource to the second storage operation cell if the first operational characteristic is near or exceeds the first threshold.

In accordance with another embodiment of the present invention, a system for optimizing performance of storage operations in a storage system including a plurality of storage operation cells and resources is provided. The system may include a storage manager that monitors an operational characteristic of a plurality of storage operation cells in the storage system; wherein the storage manager identifies a group first resources in a first storage operation cell and identifies a plurality of second storage operation cells to which the group of first resources may be transferred; and wherein the storage manager determines a potential effect that a transfer of the group of first resources to the plurality of second storage operation cells would have on the performance storage operations, and if the determined potential effect of a transfer of the group of first resources improves the performance of storage operations, the storage manager transfers the group of first resources to the plurality of second storage operation cells.

BRIEF DESCRIPTION OF THE DRAWINGS

Aspects of the invention are illustrated in the figures of the accompanying drawings which are meant to be exemplary and not limiting, in which like references are intended to refer to like or corresponding parts, and in which.

DETAILED DESCRIPTION

Figure 1:
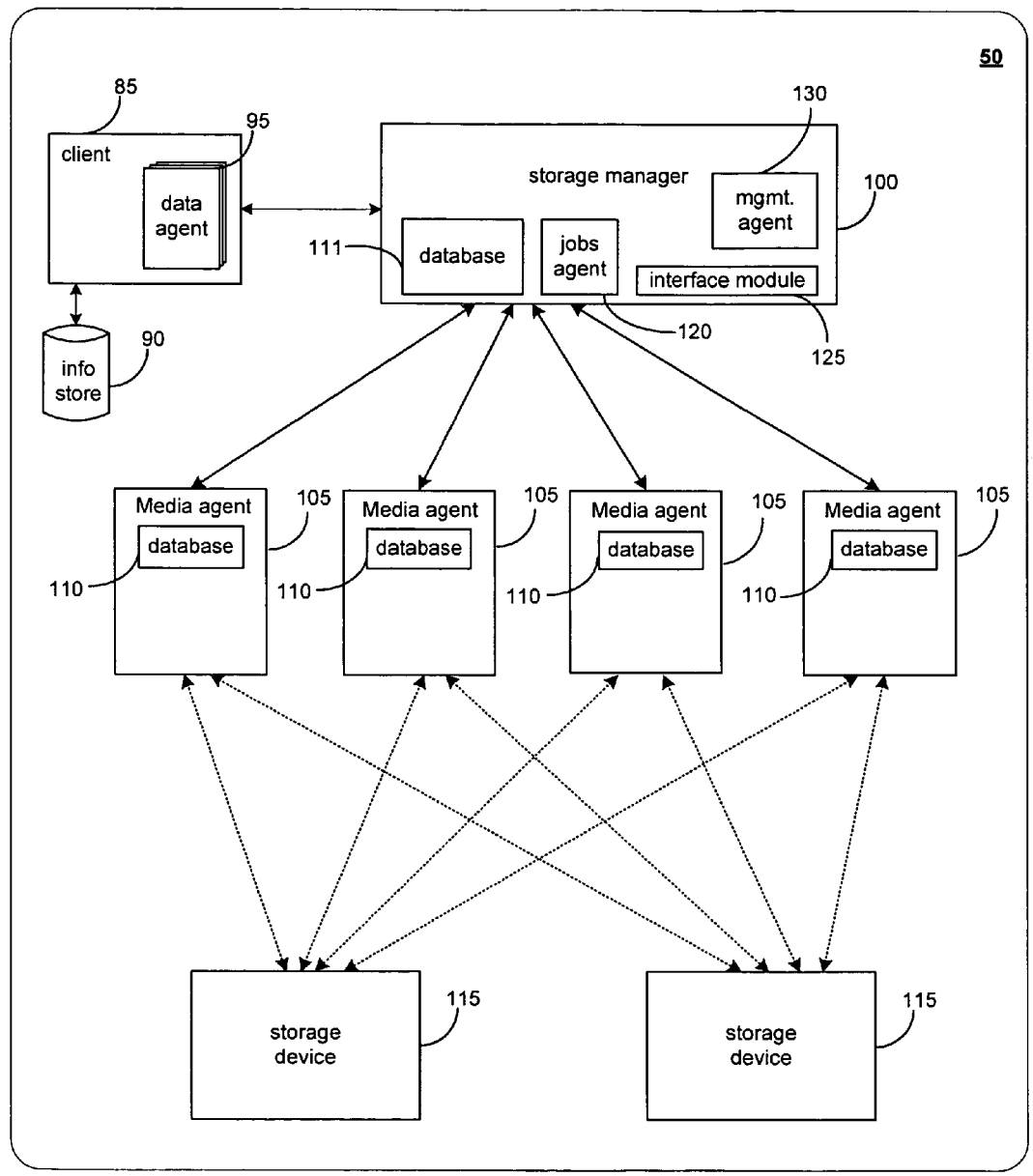
FIG. 1 is a block diagram of a storage operation cell in a system to perform storage operations on electronic data in a computer network according to an embodiment of the invention.

Systems and methods for migrating one or more components of a storage operation cell in a storage network, and for predicting certain requirements of storage operation cell components within the network are provided. In various illustrative embodiments, the present invention, among other things, provides for migrating or "reallocating" resources or components from one storage operation cell to another storage operation cell such that the migrated resources from the "source" storage operation cell become part of and operate with resources in the destination or "target" storage operation cell. Such migration typically involves logical reassignment of certain resources from one storage operation cell to another (i.e., no actual physical movement), but, in some embodiments, may include a physical movement of resources or components. For example, a change of a logical association or reassignment of resources or components may include modifying associations or groups as defined in certain management software components which may involve changing a pointer, address or other referential element in a storage management system index or database and may indicate a new or changed network pathway to a migrated resource. Physical movement however, may involve actual physical movement of some or all components from one location to another (which also, in some embodiments, may involve logical reassignment or update in management software, e.g., new cabling, routing, etc.). Migrated resources may include clients, media agents, storage managers, storage devices and/or certain associated storage media, clients, transmission resources such as pathways, switches, routers or other resources or components.

The migration of resources between storage operation cells may occur in various situations, and may be temporary or permanent. Some examples of scenarios in which resource migration maybe desirable include: failure of one or more storage operation cell resources (e.g., if one or more storage operation cell resources fails, a resource may be identified in another storage operation cell to replace the failed storage operation cell), merging storage operation cell resources (e.g., due to certain conditions within an enterprise or environment, storage operation cells may be merged to improve system performance or otherwise consolidate system resources, or to be substituted for other storage operation cells which may be removed), assisting in alleviating or reducing network congestion (e.g., one or more data pathways may be overburdened with a high volume of data transfers), changes or efficiency in using network pathways (e.g., one network pathway may be taken offline, or a network pathway may have comparatively faster/slower data transfer characteristics), load balancing (e.g., one or more media agents, storage devices or other component may be migrated to handle a high volume of data transfer streams or to more evenly distribute workload), addition or removal of storage operation cell resources (e.g., if a new storage operation cell resource may be migrated to a storage operation cell having the greatest need for such new resource, or if a resource is removed, another resource may be migrated to replace the removed resource), or other situations to facilitate certain system goals such resource optimization or data security which may arise in a storage management system.

Thus, in general, to optimize performance of storage operations in a storage management system, storage operation cell resources may be migrated to more evenly distribute workload, promote failover response and system robustness, take advantage of particular storage characteristics of a particular resource for a storage operation, merge, reorganize or otherwise reconfigure system resources, information, or data, improve or maintain network accessibility and data protection, or improve any other performance characteristics as contemplated by various aspects of the invention.

As further described herein, resource migration may be performed under user supervision (e.g., by commands or scripts input by a user via a GUI); or automatically (i.e., without user supervision; e.g., by migration or management components throughout a network or by storage managers) based on user set parameters, a threshold, a storage policy, storage preference or other preference as further described herein; or through any combination of user commands and automatically executing components. Storage operation cell migration operations may be initiated automatically as a suggested, corrective, or preemptive action with respect to enhancing system performance (e.g., to improve performance in various storage operation scenarios as described herein); or for other reasons (e.g., consolidation or reconfiguration, etc.).

One exemplary storage management system which may provide storage operation cell resource migration is described with reference to FIGS. 1 through 7, although it will be understood other storage management system architectures known in the art may also use the principles of the inventions described herein. FIG. 1 illustrates a block diagram of an illustrative storage operation cell 50 that may perform storage operations on electronic data in a computer network in accordance with an embodiment of the present invention. As shown, storage operation cell 50 may generally include a storage manager 100, a data agent 95, a media agent 105, a storage device 115, and, in some embodiments, may include certain other components such as a client 85, a data or information store 90, databases 110 and 111, jobs agent 120, an interface module 125, and a management agent 130. Such system and elements thereof are exemplary of a modular storage operation system such as the COMMVAULT QINETIX system, and also the COMMVAULT GALAXY storage operation system, available from COMMVAULT Systems, Inc. of Oceanport, N.J., and further described in U.S. Pat. No. 7,035,880, which is incorporated herein by reference in its entirety.

A storage operation cell, such as cell 50, may generally include combinations of hardware and software components associated with performing storage operations on electronic data. Exemplary storage operation cells according to embodiments of the invention may include, as further described herein, CommCells as embodied in the QNet storage management system and the QINETIX storage management system by COMMVAULT Systems of Oceanport, N.J.

Additional storage operations performed by storage operation cells may include creating, storing, retrieving, and migrating primary data copies and secondary data copies (which may include, for example, snapshot copies, backup copies, HSM copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

Storage operations may be performed according to a storage policy. A storage policy is generally a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy may be stored to a storage manager database 111, to archive media as metadata for use in restore operations or other storage operations, or to other locations or components of the system.

A schedule policy may specify when to perform storage operations and how often and may also specify performing certain storage operations on sub-clients of data and how to treat those sub-clients. A sub-client may represent static or dynamic associations of portions of data of a volume that are mutually exclusive. Thus, a portion of data may be given a label, and the association may be stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc.

Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell may contain the same or similar physical components, however, it may be configured to perform other storage operations, such as monitoring a primary data copy or performing other known storage operations.

Thus, as can be appreciated from the above, although the first and second storage operation cells are logically distinct entities and may be configured to perform different management functions (e.g., HSM and SRM respectively), each storage operation cell may contain the same or similar physical devices. Alternatively, in other embodiments, different storage operation cells may contain some or none of the same physical devices. For example, a storage operation cell 50 configured to perform SRM tasks may contain a media agent 105, client 85, or other network device connected to a primary storage volume, while a storage operation cell 50 configured to perform HSM tasks may instead include a media agent 105, client 85, or other network device connected to a secondary storage volume and not contain the elements or components associated with and including the primary storage volume. These two storage operation cells, however, may each include a different storage manager 100 that coordinates storage operations via the same media agents 105 and storage devices 115. This "overlapping" configuration allows storage resources to be accessed by more than one storage manager 100 such that multiple paths exist to each storage device 115 facilitating failover, load balancing, and promoting robust data access via alternative routes.

Alternatively, in some embodiments, the same storage manager 100 may control two or more storage operation cells 50 (whether or not each storage operation cell 50 has its own dedicated storage manager 100). Moreover, in certain embodiments, the extent or type of overlap may be user-defined (e.g., through a control console (not shown)) or may be automatically configured to optimize data storage and/or retrieval.

Data agent 95 may be a software module or part of a software module that is generally responsible for archiving, migrating, identifying, and recovering data from client computer 85 stored in an information store 90 or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Embodiments of the present invention may employ multiple data agents 95 each of which may perform a storage operation, e.g., backup, migrate, and recover data associated with a different application. For example, different individual data agents 95 may be designed to handle MICROSOFT EXCHANGE® data, Lotus Notes data, MICROSOFT WINDOWS® 2000 file system data, MICROSOFT Active Directory Objects data, and other types of data known in the art. Other embodiments may employ one or more generic data agents 95 that can handle and process multiple data types rather than using the specialized data agents described above.

If a client computer 85 has two or more types of data, one data agent 95 may be required for each data type to archive, migrate, and restore the client computer 85 data. For example, to backup, migrate, and restore all of the data on a MICROSOFT EXCHANGE® 2000 server, the client computer 85 may use one MICROSOFT EXCHANGE® 2000 Mailbox data agent 95 to backup the EXCHANGE 2000 mailboxes, one MICROSOFT EXCHANGE® 2000 Database data agent 95 to backup the EXCHANGE 2000 databases, one MICROSOFT EXCHANGE® 2000 Public Folder data agent 95 to backup the EXCHANGE 2000 Public Folders, and one MICROSOFT WINDOWS® 2000 File System data agent 95 to backup the client computer's 85 file system. These data agents 95 would be treated as four separate data agents 95 by the system even though they reside on the same client computer 85.

Alternatively, other embodiments may use one or more generic data agents 95, each of which may be capable of handling two or more data types. For example, one generic data agent 95 may be used to back up, migrate and restore MICROSOFT EXCHANGE® 2000 Mailbox data and MICROSOFT EXCHANGE® 2000 Database data while another generic data agent may handle MICROSOFT EXCHANGE® 2000 Public Folder data and MICROSOFT WINDOWS® 2000 File System data, etc.

Generally speaking, storage manager 100 may be a software module or other application that coordinates and controls storage operations performed by storage operation cell 50. Storage manager 100 may communicate with some or all elements of the storage operation cell 50 including client computers 85, data agents 95, media agents 105, and storage devices 115, to initiate and manage system backups, migrations, and data recovery.

Storage manager 100 may include a jobs agent 120 that monitors the status of some or all storage operations previously performed, currently being performed, or scheduled to be performed by storage operation cell 50. Jobs agent 120 may be communicatively coupled with an interface agent 125 (typically a software module or application). Interface agent 125 may include information processing and display software, such as a graphical user interface ("GUI"), an application program interface ("API"), or other interactive interface through which users and system processes can retrieve information about the status of storage operations. Through interface 125, users may optionally issue instructions to various storage operation cells 50 regarding performance of the storage operations as described and contemplated by the present invention. For example, a user may modify a schedule concerning the number of pending snapshot copies (or other types of copies) scheduled as needed to suit particular needs or requirements. As another example, a user may employ the GUI to view the status of pending storage operations in some or all of the storage operation cells in a given network; or to monitor the status of certain components in a particular storage operation cell (e.g., the amount of storage capacity left in a particular storage device). As a further example, interface 125 may display the cost metrics associated with a particular type of data storage and may allow a user to determine overall and target cost metrics associated with a particular data type, or certain storage operation cell 50 or other storage operation as predefined or user-defined (discussed in more detail below).

Storage manager 100 may also include a management agent 130 that is typically implemented as a software module or application program. In general, management agent 130 provides an interface that allows various management components 100 in other storage operation cells 50 to communicate with one another. For example, assume a certain network configuration includes multiple storage operation cells 50 adjacent to one another or otherwise logically related in a WAN or LAN configuration (not shown). With this arrangement, each storage operation cell 50 may be connected to the other through each respective interface module 125. This allows each storage operation cell 50 to send and receive certain pertinent information from other storage operation cells 50, including status information, routing information, information regarding capacity and utilization, etc. These communication paths may also be used to convey information and instructions regarding storage operations.

For example, a management agent 130 in first storage operation cell 50 may communicate with a management agent 130 in a second storage operation cell 50 regarding the status of storage operations in the second storage operation cell. Another illustrative example includes the case where a management agent 130 in first storage operation cell 50 communicates with a management agent 130 in a second storage operation cell to control the storage manager 100 (and other components) of the second storage operation cell via the management agent 130 contained in the storage manager 100.

Another illustrative example is the case where management agent 130 in the first storage operation cell 50 communicates directly with and controls the components in the second storage operation cell 50 and bypasses the storage manager 100 in the second storage operation cell. If desired, storage operation cells 50 can also be organized hierarchically such that hierarchically superior storage operation cells control or pass information to hierarchically subordinate storage operation cells or vice versa. More information regarding hierarchical organization of operation storage cells 50 will be provided below.

Storage manager 100 may also maintain an index cache, a database, or other data structure 111. The data stored in database 111 may be used to indicate logical associations between components of the system, user preferences, management tasks, or other useful data. As further described herein, some of this information may be stored in a media agent database or other local data store according to some embodiments. For example, the storage manager 100 may use data from database 111 to track logical associations between media agents 105 and storage devices 115.

Generally speaking, a media agent 105 may be implemented as software module that conveys data, as directed by a storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to particular storage device 115.

In operation, a media agent 105 associated with a particular storage device 115 may instruct the storage device to use a robotic arm or other retrieval means to load or remove a certain storage media, and to subsequently archive, migrate, or restore data to or from that media. Media agents 105 may communicate with a storage device 115 via a suitable communications path such as a SCSI or fiber channel communications link. In some embodiments, the storage device 115 may be communicatively coupled to a media agent 105 via a Storage Area Network ("SAN").

Each media agent 105 may maintain an index cache, a database, or other data structure 110 which stores index data generated during backup, migration, and restore and other storage operations as described herein. For example, performing storage operations on MICROSOFT EXCHANGE® data may generate index data. Such index data provides a media agent 105 or other external device with a fast and efficient mechanism for locating data stored or backed up. Thus, in some embodiments, a storage manager database 111 may store data associating a client 85 with a particular media agent 105 or storage device 115, for example, as specified in a storage policy, while media agent database 110 may indicate where specifically the client 85 data is stored in storage device 115, what specific files were stored, and other information associated with storage of client 85 data. In some embodiments, such index data may be stored along with the data backed up in a storage device 115, with an additional copy of the index data written to index cache 110. The data in index cache 110 is thus readily available for use in storage operations and other activities without having to be first retrieved from the storage device 115.

In some embodiments, certain components may reside and execute on the same computer. For example, in some embodiments, a client computer 85 such as a data agent 95, a media agent 105, or a storage manager 100 coordinates and directs local archiving, migration, and retrieval application functions as further described in U.S. Pat. No. 7,035,880. This client computer 85 can function independently or together with other similar client computers 85.

Figure 2:
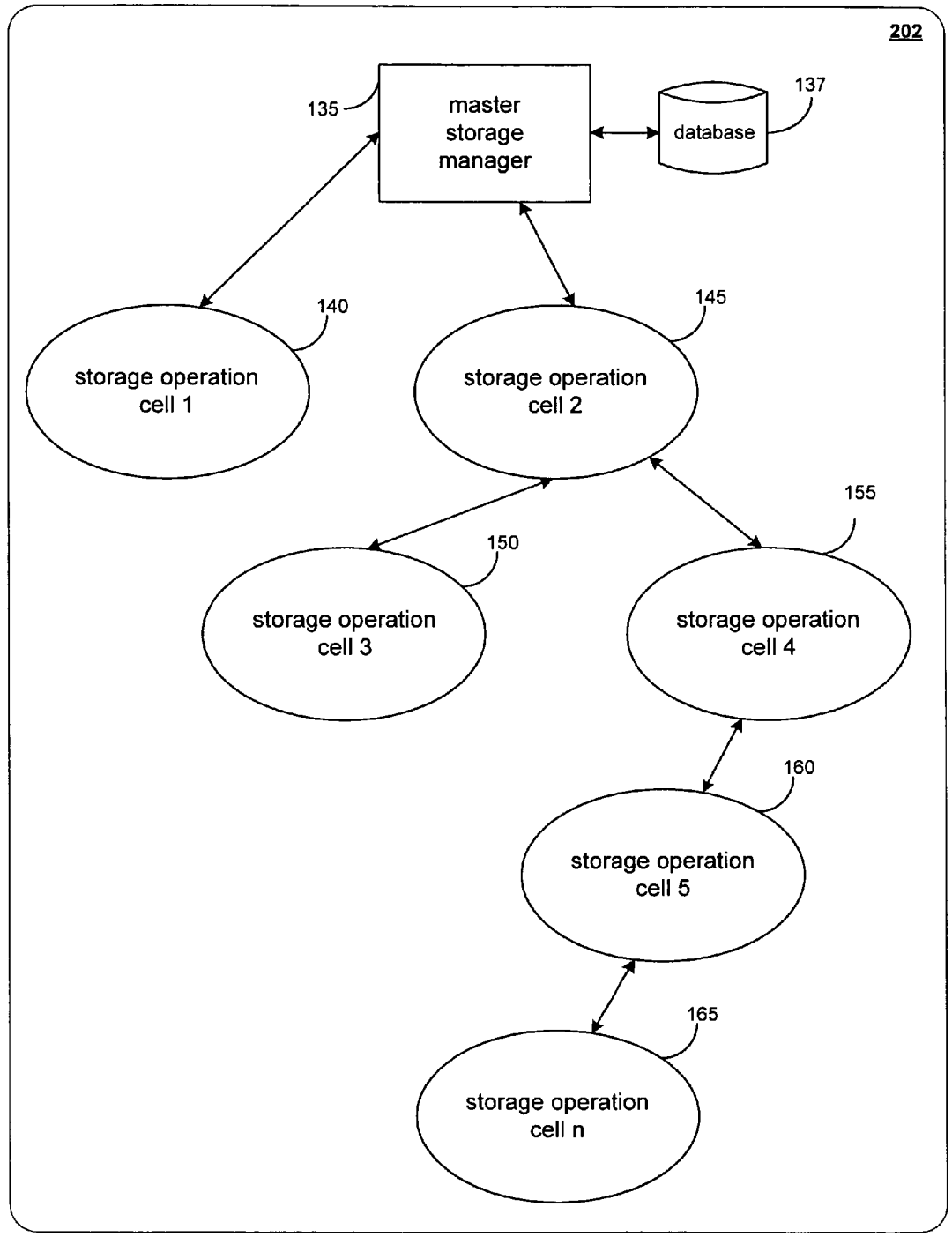
FIG. 2 is a block diagram of a hierarchically organized group of storage operation cells in a system to perform storage operations on electronic data in a computer network, according to an embodiment of the invention.

FIG. 2 presents a generalized block diagram of a hierarchically organized group of storage operation cells in a system to perform storage operations on electronic data in a computer network in accordance with an embodiment of the present invention. It will be understood that although the storage operation cells generally depicted in FIG. 2 have different reference numbers from the storage operation cell 50 shown in FIG. 1, these storage operation cells may be configured the same as or similar to the storage operation cell 50 depicted in FIG. 1.

As shown, the system illustrated in FIG. 2 may include a master storage manager component 135 and various other storage operation cells. As shown, the illustrative embodiment in FIG. 2 includes a first storage operation cell 140, a second storage operation cell 145, a third storage operation cell 150, a fourth storage operation cell 155, a fifth storage operation cell 160, and an nth storage operation cell 165. However, it will be understood this illustration is only exemplary and that fewer or more storage operation cells may be present or interconnected differently if desired.

Storage operation cells, such as the ones shown in FIG. 2 may be communicatively coupled and hierarchically organized. For example, a master storage manager component 135 may be associated with, communicate with, and direct storage operations for, a first storage operation cell 140, a second storage operation cell 145, a third storage operation cell 150, a fourth storage operation cell 155, a fifth storage operation cell 160, and an nth storage operation cell 165. In some embodiments, the master storage manager component 135 may not be part of any particular storage operation cell. In other embodiments (not shown), master storage manager component 135 may itself be part of a certain storage operation cell.

Thus, in operation, master storage manager component 135 may communicate with a management agent of the storage manager of the first storage operation cell 140 (or directly with the other components of first storage operation cell 140) with respect to storage operations performed in the first storage operation cell 140. For example, in some embodiments, master storage manager component 135 may instruct the first storage operation cell 140 with certain commands regarding a desired storage operation such as how and when to perform particular storage operations including the type of operation and the data on which to perform the operation.

In other embodiments, master storage manager component 135 may track the status of its associated storage operation cells, such as the status of jobs, system components, system resources utilization, and other items, by communicating with manager agents (or other components) in the respective storage operation cells. Moreover, master storage manager component 135 may track the status of its associated storage operation cells by receiving periodic status updates from the manager agents (or other components) in the respective storage operation cells regarding jobs, system components, system resources, and other items. For example, master storage manager component 135 may use methods to monitor network resources such as mapping network pathways and topologies to, among other things, physically monitor storage operations and suggest, for example, alternate routes for storing data as further described herein.

In some embodiments, master storage manager component 135 may store status information and other information regarding its associated storage operation cells and other system information in an index cache, database 137 or other data structure accessible to mater storage manager component 135. A presentation interface included in certain embodiments of master storage manager component 135 may access this information and present it to users and system processes with information regarding the status of storage operations, storage operation cells, system components, and other information of the system.

As mentioned above, storage operation cells may be organized hierarchically. With this configuration, storage operation cells may inherit properties from hierarchically superior storage operation cells or be controlled by other storage operation cells in the hierarchy (automatically or otherwise). Thus, in the embodiment shown in FIG. 2, storage operation cell 145 may control or is otherwise hierarchically superior to storage operation cells 150, 155, 160, and 165. Similarly, storage operation cell 155 may control storage operation cells 160 and 165. Alternatively, in some embodiments, storage operation cells may inherit (or otherwise be associated with) storage policies, storage preferences, storage metrics, or other properties or characteristics according to their relative position in a hierarchy of storage operation cells.

Storage operation cells may also be organized hierarchically according to function, geography, architectural considerations, or other factors useful or desirable in performing storage operations. For example, in one embodiment, storage operation cell 140 may be directed to create snapshot copies of primary copy data, while storage operation cell 145 may be directed to create backup copies of primary copy data or other data.

As another example, storage operation cell 140 may represent a geographic segment of an enterprise, such as a Chicago office, and storage operation cell 145 may represents a different geographic segment, such as a New York office. In this example, the second storage operation cells 145, 150, 155, 160, and 165 may represent departments within the New York office. Alternatively, these storage operation cells could be further divided by function performing various storage operations for the New York office or load balancing storage operations for the New York office.

As another example, and as previously described herein, different storage operation cells directed to different functions may also contain the same or a subset of the same set of physical devices. Thus, one storage operation cell in accordance with some embodiments of the present invention may be configured to perform SRM operations (such as a QSM cell in the COMMVAULT QINETIX system) and may contain the same, similar or a subset of the same physical devices as a cell configured to perform HSM or other types of storage operations. Each storage operation cell may, however, share the same parent or, alternatively, may be located on different branches of a storage operation cell hierarchy tree. For example, storage operation cell 140 may be directed to SRM operations whereas storage operation cell 155 may be directed to HSM operations. Similarly, storage operation cell 150 may be configured to perform SRM operations and storage operation cell 155 may be configured to perform HSM operations. Those skilled in the art will recognize that a wide variety of such combinations and arrangements of storage operation cells are possible to address a broad range of different aspects of performing storage operations in a hierarchy of storage operation cells.

In some embodiments, hierarchical organization of storage operation cells facilitates, among other things, system security and other considerations. For example, in some embodiments, only authorized users may be allowed to access or control certain storage operation cells. A network administrator for an enterprise may have access to many or all storage operation cells including master storage manager 135. But a network administrator for the New York office, according to a previous example, may only have access to storage operation cells 145-165, which form the New York office storage management system.

The hierarchical organization of storage operation cells may facilitate storage management planning and decision-making. For example, in some embodiments, data and other information related to HSM storage operation cells and SRM storage operation cells may be normalized (e.g., converted into a common format with normalized identifiers and other information) and combined by a master storage manager component or other hierarchically superior (or, if desired, hierarchically subordinate) component, and a user of master storage manager component 135 may view the status of some or all jobs in associated storage operation cells as well as the status of each component of the storage operation cells present in the system. Users may then plan and make decisions based on this global data. For example, a user may view high-level information regarding storage operations for the entire system, such as job status, component status, resource status (such as network pathways, etc.), and other information. This may be done from an SRM perspective to view primary copy information or from an HSM perspective to view secondary copy information. A user may also drill down through menus or use other means to obtain more detailed information regarding a particular storage operation cell or group of storage operation cells.

In other embodiments master storage manager component 135 may alert a user such as a system administrator when a particular resource is unavailable or congested. For example, a particular storage device might be full or require additional media. As another example, a master storage manager component may use information from an HSM storage operation cell and an SRM storage operation cell to present indicia or otherwise alert a user or otherwise identify aspects of storage associated with the storage management system and hierarchy of storage operation cells.

Alternatively, a storage manager in a particular storage operation cell may be unavailable due to hardware failure, software problems, or other reasons. In some embodiments, master storage manager component 135 (or another storage manager within the hierarchy of storage operation cells) may utilize the global data regarding its associated storage operation cells to suggest solutions to such problems when they occur (or act as a warning prior to occurrence). For example, master storage manager component 135 may alert the user that a storage device or other resource in a particular storage operation cell is full or otherwise congested, and then suggest, based on job and data storage information contained in its database, an alternate storage device or resource to migrate to the storage operation cell. Other types of corrective actions based on such information may include suggesting an alternate data path to a particular storage device, or dividing data to be stored among various available storage devices as a load balancing measure or to otherwise optimize storage or retrieval time. In some embodiments, such suggestions or corrective actions may be performed automatically, if desired.

Examples of the types of information that may be monitored for an application such as MICROSOFT EXCHANGED® include:
    File Systems and File Analysis
        Distribution by file types
        Distribution by file sizes
        Distribution by modification time/access time
        Distribution by owner, etc.
    Capacity and Asset Reporting
        By host
        By disk
        By partitions
        Availability Reporting
        Disks
        Hosts
        Applications
    Message Level
        Distribution across mailboxes
        By Message attachment type
        By Message age
        Data Migration report
        Usage Reporting
        By Storage Group
        By Store
        By Mailbox, etc.

In alternate embodiments, HSM and SRM components may be aware of each other due to a common database or metabase of information, which may include normalized data. Therefore, in those embodiments there is no need for such information to pass through a master storage manager as these components may be able to communicate directly with one another. For example, storage operation cell 150 may communicate directly with storage operation cell 165 and vice versa. This may be accomplished through a direct communications link between the two (not shown) or by passing data through intermediate storage operation cells, such as storage operation cells 145-160 in this case.

Figure 3:
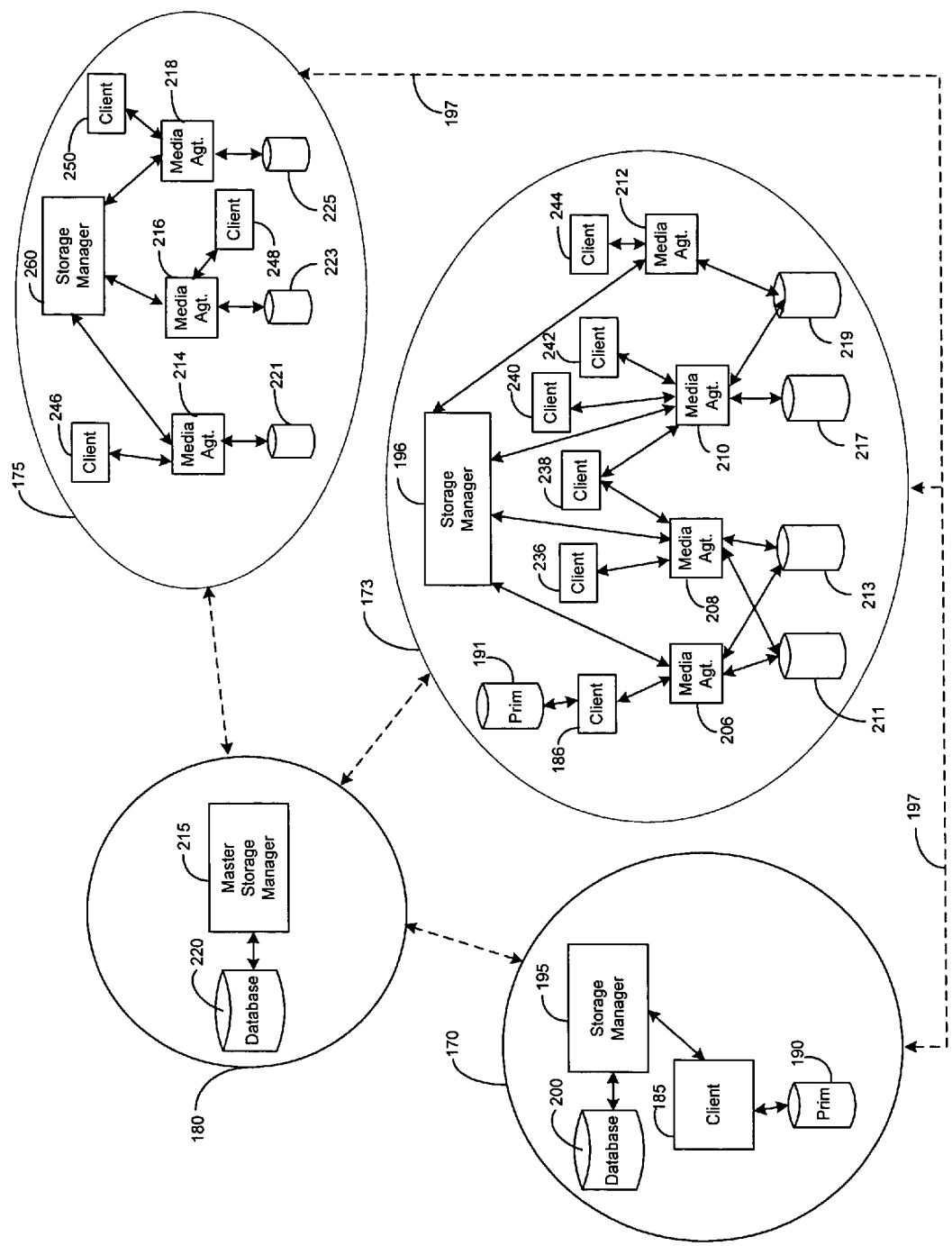
FIG. 3 is a block diagram of a hierarchically organized group of storage operation cells in a system to perform resource migration between storage operation cells according to an embodiment of the invention.

FIG. 3 illustrates a block diagram of a hierarchically organized group of storage operation cells in a system to perform SRM and HSM storage operations on electronic data in a computer network in accordance with various illustrative implementations for migrating resources between storage operation cells in accordance with the present invention. As will be further understood from the following description, however, implementing storage operation cell component migration according to the present invention is not limited to having a particular organization of storage operation cells, nor to having storage operation cells with HSM and/or SRM component functionality. For instance, the storage operation cells may be organized non-hierarchically or hierarchically, and may be implemented with or without a storage operation cell having a storage manager that functions as a master storage manager. As a further example, the network is not required to include a storage operation cell that performs SRM operations and not HSM storage operations.

As shown, the network in FIG. 3 includes a first storage operation cell 170, a second storage operation cell 173, a third storage operation cell 175, and a fourth storage operation cell 180. First storage operation cell 170 includes a client 185 in communication with a primary volume 190 storing data, and a storage manager component 195 in communication with a storage manager database 200 and with client 185. Second storage operation cell 173 includes a client 186 in communication with a primary volume 191, a media agent 206 in communication with a secondary storage media 211 and a secondary storage media 213, clients 236-244 in communication with respective primary volumes (not shown for clarity of illustration), media agents 208, 210, and 212 in communication with one or more of storage volumes 211, 213, 217, and 219, and storage manager 196 in communication with each of the media agents 206, 208, 210, and 212 in storage operation cell 173. Third storage operation cell 175 includes clients 246 and 250 in communication with respective primary volumes (not shown), media agents 214, 216, and 218 in respective communication with secondary storage media 221, 223, and 225, and storage manager 260 in communication with each of the media agents in storage operation cell 175. Fourth storage operation cell includes a master storage manager component 215 in communication with a master storage manager database 220.

With regard to FIG. 3, databases 220 and 200 respectively associated with storage managers 215 and 195 are expressly depicted, storage managers 196 and 260 are similarly each in communication with a respective database; however, these databases are not separately depicted and may be considered as being included in storage managers 196 and 260, in accordance with the illustrative storage manager 100 of FIG. 1. Additionally, in this embodiment, each depicted client device in storage operation cells 173 and 175 is in communication with the storage manager within its storage operation cell, but connecting lines are not shown for clarity of illustration. Depicted lines connecting media agents with clients and with storage volumes represent possible data flow paths according to the illustrative configuration. Thus, a given media agent may be operative in storage operations (e.g., backup, archiving, restoring) with respect to any storage volume and any client to which it is illustrated as being connected by a solid line. Depicted lines connecting a media agent to a storage manager represent control information and/or metadata paths.

The first storage operation cell 170 may be configured to perform a particular type of storage operation, such as SRM storage operations. For example, the first storage operation cell 170 may monitor and perform SRM-related calculations and operations associated with primary copy data. Thus, the first storage operation cell 170 includes a client component 185 in communication with a primary volume 190 for storing data. For example, client 185 may be directed to using EXCHANGE data, SQL data, Oracle data, or other types of production data used in business applications (or other applications) and stored in primary volume 190. Storage manager component 195 may contain modules or other logic directed to monitoring or otherwise interacting with attributes, characteristics, metrics, and other information associated with the data stored in primary volume 190. Storage manager 195 may track and store this and other information in storage manager database 200 which may include index information. For example, in some embodiments, storage manager component 195 may track or monitor the amount of available space and other similar characteristics of data associated with primary volume 190.

In some embodiments, as further described herein, storage manager component 195 may also issue alerts or take other actions when the information associated with primary volume 190 satisfies certain criteria, such as alert criteria, criteria defined in a storage policy, a threshold, such as a user defined threshold or default threshold, or other criteria. In some embodiments, action may be taken or alerts sent if a characteristic relating to a storage manager, media agent, database, storage device, storage library, client or other component matches the criteria. Such criteria may relate to resource characteristics, including, for example, network bandwidth utilization, resource capacity used or available, time period between storage operations, scheduling conflicts, processor loads, or other characteristics relating to performing a storage operation.

Second storage operation cell 173 may be directed to another type of storage operation, such as HSM storage operations. For example, the second storage operation cell 173 may perform backups, data migrations, snapshots, or other types of HSM-related operations known in the art. For example, in some embodiments, data is migrated from faster and more expensive storage such as magnetic disk storage (i.e., primary storage) to less expensive storage such as tape storage (i.e., secondary storage).

Thus, the second storage operation cell 173 includes client component 186 in communication with the primary volume 191 storing data. In some embodiments, client component 186 and primary volume 191 are the same physical devices as the client component 185 and primary volume 190 in the first storage operation cell 170. Similarly, in some embodiments, the storage manager component 196 and its associated database (not shown, and which may include index information) in the second storage operation cell 173 are the same physical devices as the storage manager component and index in the first storage operation cell 170. Storage manager component 196, however, typically also contains HSM modules or other logic associated with the second storage operation cell 173 directed to performing HSM storage operations on primary volume 191 data.

Storage operation cell 173 therefore may also contain media agent 206 and a secondary storage media 211 configured for performing HSM-related operations on primary copy data stored on primary volume 191. For example, storage manager 196 may migrate primary copy data from primary volume 191 to secondary volume 211 using media agent 206. Storage manager 196 may also track and store information associated with primary copy migration and other similar HSM-related operations in its storage manager database (not shown). For example, in some embodiments, storage manager component 196 may direct HSM storage operations on primary copy data according to a storage policy associated with the primary copy 191 and stored in an index. In some embodiments, storage manager 196 may also track where primary copy information is stored, for example in secondary storage 211. Storage manager 196, media agents 206, 208, 210, and 212, and secondary storage media 213 and 217 may also be configured to perform such HSM storage operations with respect to primary copy data associated with clients 236, 238, 240, 242, and 244. Further, storage operation cell 175 may similarly be configured for performing such HSM storage operations with respect to primary copy data associated with clients 246, 248, and 250.

Storage operation cell 180 may include a master storage manager 215 and a master storage manager 220. In some embodiments (not shown), additional storage operation cells may be located hierarchically in between storage operation cell 180 and storage operation cells 170, 173, and 175. In some embodiments, additional storage operation cells hierarchically superior to operation cell 180 may also be present in the hierarchy of storage operation cells.

In some embodiments, storage operation cells 170, 173, and 175 may be connected by communications link 197, which may be any suitable communications link such as a fiber channel or SCSI connection that allows storage operation cells 170, 173, and 175 to communicate directly with one another (i.e., without necessarily directly or indirectly involving storage operation cell 180). Such communication between cells 170 and 173 may be accomplished, for example, by storage manager 195 communicating with storage manager 196 via link 197. This allows storage operation cells 170 and 173 to share information such as status or operational characteristics with one another such as availability on primary or secondary storage, trigger events based on such information, etc. This allows for the direct transfer of stored data to and from the storage operation cells (via link 197) without the need to communicate with or pass data through master storage manager 215.

Storage operation cell 180 is also generally directed to performing certain types of storage operations, such as integration of SRM and HSM data from other storage operation cells, such as storage operation cells 170, 173, and 175. In some embodiments, fourth storage operation cell 180 also performs other types of storage operations and might also be directed to HSM, SRM, or other types of storage operations for other reasons such as convenience, hardware allocation, media managers, administrative or organization reasons, etc.

Figure 4:
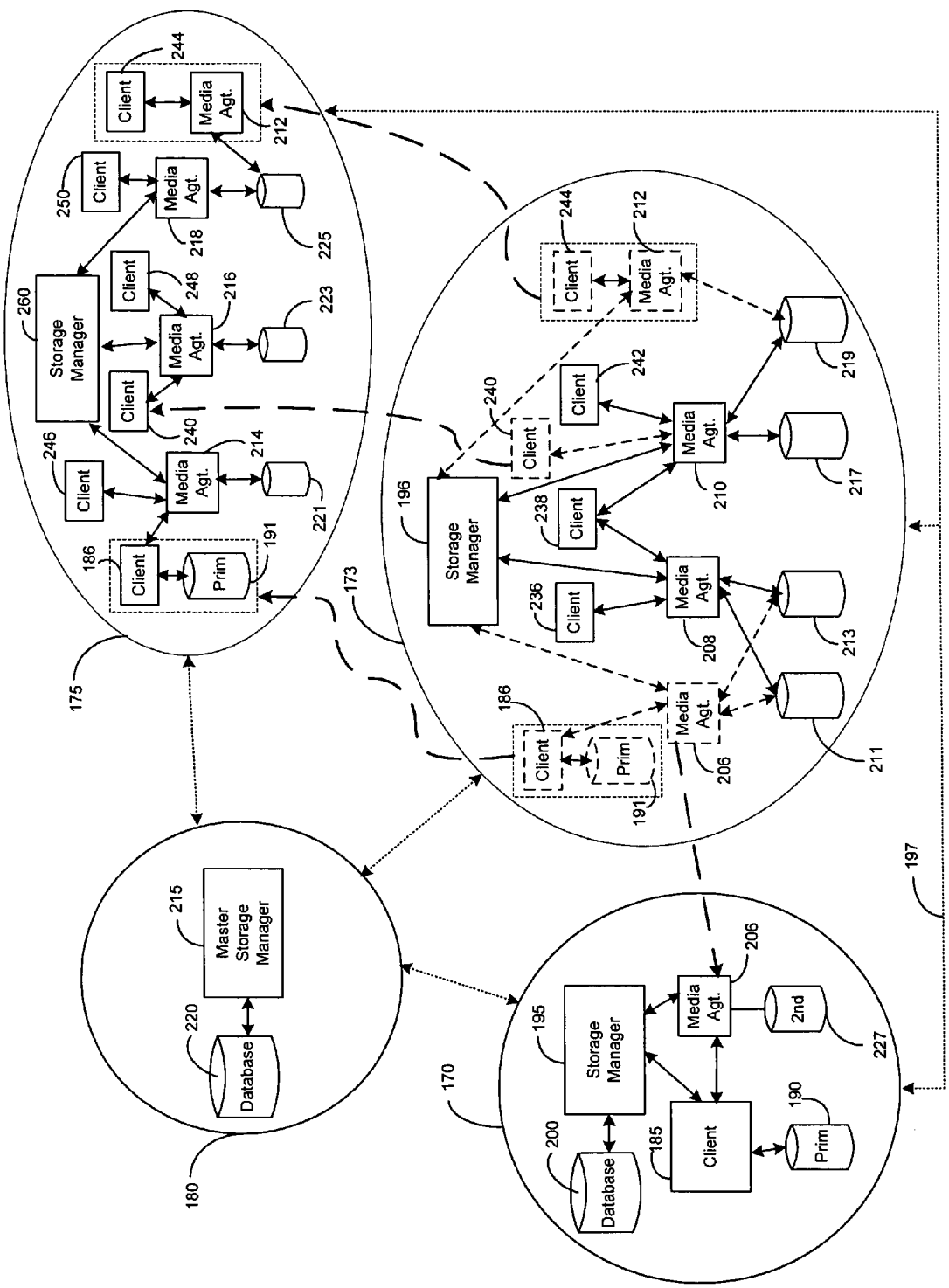
FIG. 4 schematically depicts migration of various clients and media agents between storage operation cells in the hierarchically organized network of FIG. 3, according to an embodiment of the invention.

FIG. 4 is a schematic depiction of migration of various components or resources, such as clients, media agents, primary storage, secondary storage databases, storage managers or other components from one storage operation cell to another storage operation cell in accordance with certain aspects of the present invention. As shown, this may include, for example, movement of certain resources from storage operation cell 173 to storage operation cells 170 and 175 in the illustrative configuration of FIG. 3. As described herein, migration of storage operation cell resources may be used to optimize, consolidate, reorganize or otherwise reconfigure or transfer storage resources or components within the system. As mentioned above, migration of resources typically involves logical reassignment of certain resources, but may, in certain situations, also involve physical movement.

Logical migration may include associating or assigning a resource to another storage operation cell. This may involve logically reassigning the resource to another storage operation cell by transferring the management information associated with that resource, as well as reassigning that resource itself to another storage operation cell. For example, a media agent may be transferred from one storage operation cell to another by transferring management information regarding the media agent to the new storage operation cell and logically reassigning the media associated with that agent to the new storage operation cell (without any actual physical movement). Thus, for example, storage manager database entries may be copied and repopulated with new links, path, and address information, etc. as necessary to complete the transfer and bring the transferred resources to a fully operational state within the new storage operation cell.

Migration of resources may be initiated by a storage manager, such as a master storage manager, or other component, or by a user, according to user selections or preferences. For example, a user may identify certain resources within a storage operation cell that are operating beyond a specified capacity or that are underutilized, and mark those resources as possible migration candidates (e.g., placed in a migration pool).

Alternatively, a storage manager, or other system component, may monitor storage operation cells to determine whether storage operation cell resources are performing adequately or as desired, e.g., within a threshold or according to an operating criteria or characteristic, or otherwise detect that storage operation cell configurations are performing below an optimal, required or desired level. Based on acquired information, resources may be migrated to provide load balancing, promote efficient use of resources (e.g., storage media), improve data throughput, or provide other resource optimization. Resources may also be migrated and/or combined for convenience or administrative or organizational purposes (e.g., merge or close physical offices etc.).

In general, migrating a resource from a source storage operation cell to a target storage operation cell may involve logically associating the migrated resource with target storage operation cell (without necessarily requiring actual physical movement). Information relating to the logical association(s) of migrated components may be stored in an index, metabase, or database, for example database 220 (e.g., a storage manager database). Such logical associations may include pointers to a new storage operation cell, a network pathway, or other indication that a storage operation cell resource has migrated. For example, if a client is moved from one storage operation cell to another, information from the source storage operation cell including information from a storage manager and/or associated media agent(s) may also be migrated to the appropriate resources in the target storage operation cell; and a pointer or other referential element may be placed in the source storage operation cell to indicate the client's new location.

In some embodiments, substantially all of this information may be moved to the target storage operation cell from the source storage operation cell. For example, some or all information such as management information in an index or metabase may be migrated along with the resource so the resource may be reconstituted and resume normal operation in the target storage operation cell. This may include both data and media (e.g., media agents and their associated media libraries).

However, in certain circumstances, some or all of this management information may remain in the source storage operation cell. For example, a client may be moved from one storage operation cell to another, but one or more storage devices that store data from that client may remain in the source storage operation cell. In this case, this data from that client may remain in the source storage operation cell along with associated management information.

In the case where data needs to be retrieved from the source storage operation cell, the target storage operation cell may include a pointer or other reference to the appropriate location in the source storage operation cell. In other embodiments, however, associated storage devices and/or the data itself associated with the migrated client may be migrated to the target storage operation cell, in which case substantially all management information may be also be migrated to the target storage operation cell. In yet other embodiments, management information may remain in both storage operation cells with both sets of information updated as changes occur. In yet other embodiments, data may be present in one storage operation cell with the client in a different storage operation cell, with pointers and references at the storage managers of each cell for interoperation.

In one example, a storage policy may indicate that a storage operation, such as a secondary copy operation is to be performed on a daily basis for a particular client using a particular media agent and storage device. However, if the client is removed from the network and no longer producing data on which a storage operation is performed, the media agent and storage device associated with storage operations for that client may be migrated to another storage operation cell for other uses (even if the media agent is still associated with clients in the original cell). Alternatively, if a client is reassigned within a network from one department or domain to another, the associated media agent and storage device may be reassigned or referenced to a storage operation cell that is already associated with the other department or domain, or even reassigned or referred to some other storage operation cell.

In another example, clients may be added to an existing storage operation cell, and may generate data that exceeds media capacity of one or more storage devices in a storage operation cell. In this example, a storage device from another storage operation cell may be identified to migrate to the storage operation cell to provide additional media capacity, or alternatively, one or more of the clients may be migrated to another storage operation cell that includes sufficient storage capacity to handle the load. In other embodiments, a client may be split or partitioned between two or more storage operation cells. In this case, the data agent associated with the client may be registered for operation in those storage operation cells as well, with some data in a first storage operation cell and some data in other storage operation cells.

Other situations causing bottlenecks, underutilization, or over-utilization of storage management resources may also arise in which it may be useful or desirable to migrate or reassign one or more resources to improve storage operation performance.

In FIG. 4, the outline of the migrated devices or components and the changed data/information communication paths in the source storage operation cell 173 are depicted by dashed lines to indicate their migration, transfer, or removal from the source storage operation cell, and the migrated devices or components (identified by identical reference numerals) are depicted by solid lines in the target storage operation cell (i.e., cells 170 and 175) to indicate their migration to that target storage operation cell.

More specifically, as shown, client 240 and data from storage manager 196 may be migrated from source storage operation cell 173 to target storage operation cell 175 (including storage manager 260) such that media agent 216 (or other media agent(s) of storage operation cell 175) is operative in managing data movement (e.g., for a storage operation, such as a backup, recovery, or migration) between primary storage volume of client 240 and secondary storage media 223. Transferring client 240 may occur and be desirable, for example, in the event that client 240 is moved from one enterprise department to another department, or in the event that media agent 210 previously associated with client 240 becomes overburdened, or is otherwise unavailable to perform specified functions. It will be understood that client 240 may be reassigned without any physical movement of client 240, but rather by movement of management information and logical reassignment within the system. Such an operation may sometimes be referred to herein as "migration" of one or more resources from one storage operation cell to another.

Continuing with the embodiment illustrated in FIG. 4, client 244 together with its associated media agent 212 may be migrated from source storage operation cell 173 to storage operation cell 175, with media agent 212 subsequently being associated with secondary storage media 225 to manage data movement between client 244 (i.e., its primary storage volume) and secondary storage media 225. Client 244 its associated storage manager data and possibly its associated media agent 212, and media library and any other necessary or useful routing or management data may be migrated or transferred, for example, in the event that a storage volume 219 reaches a capacity that exceeds a threshold or criteria, or in another scenario in which it is desirable to migrate client 244 and media agent 212.

Continuing with the illustrative embodiment, client 186 (including its primary storage volume 191 and storage manager data) may be migrated from source storage operation cell 173 to storage operation cell 175 such that media agent 214 (or other media agent in cell 175) is operative in managing data movement (e.g., for a storage operation, such as a backup, recovery, or migration) between primary storage volume 191 and secondary storage media 221. Client 186 and its associated storage manager data may be migrated or transferred, for example, because media agent 214 is underutilized in storage operations and has capacity which meets a threshold or criteria, or media agent 206 is overburdened and exceeds a bandwidth threshold or criteria, or satisfies other criteria in which it may be desirable to transfer client 186.

Moreover, media agent 206 may be migrated from source storage operation cell 173 to storage operation cell 170 and associated with secondary storage media 227 to conduct data between client 185 or other clients (not shown) and secondary storage media 227, providing for a storage operation, or a backup of data on primary storage volume 190. Alternatively or additionally, media agent 206 may remain associated with secondary storage media 211 to direct a storage operation of a primary storage volume 190 thereto, and, in such cases, secondary storage media 211 may also be migrated to storage operation cell 170, and its association with media agent 208 may be removed. Such migration may occur, for example, in the event that media agent 206 has a characteristic such as bandwidth, meeting a threshold or criteria to perform storage operations relating to client 185 and media agent 208 has a characteristic, such as bandwidth, to take over control of storage media 211. In other situations, it may be desirable to move client 185 to another storage operation cell, without media agent 206, and reassign client 185 to a new media agent in the new storage operation cell. This may involve migrating some or all of management from agent 206 and any associated storage manager information associated with the client as further described herein.

It will be understood, the migration of the resources as illustrated in FIG. 4 may be based on the following illustrative situation prior to migration. With regard to media agent 206, in addition to handling storage operation data movement between primary storage volume 191, media agent 206 may also be operative in performing storage operations for primary storage volume 190 of client 185 via link 197. The workload of handling data movement in a storage operation for both of these primary storage volumes may overload media agent 206 and cause congestion. Likewise, clients 238, 240, and 242 may over utilize media agent 210, thus causing congestion and delay, for example, in network pathways to media agent 210, and also rapidly consume the storage capacity of storage media 217 and 219. Further, performing a storage operation of client 244 via media agent 212 increases the storage capacity consumption rate of media 219.

In this example, load balancing techniques and reallocation within a the storage operation cell alone may not adequately mitigate these problems, or may not represent an optimal solution compared to possibly migrating one or more resources to another storage operation cell (with or without migrating resources within the storage operation cell).

Load redistribution may be addressed according to the resource migration described above in connection with FIG. 4. Thus, client 186 (with primary storage volume 191) and client 244 and their associated data may be migrated to storage operation cell 175, assigning each of these clients to a respective media agent and associated secondary storage that will not be overloaded or over-utilized by the addition of these clients. With the migration of client 186, media agent 206 may now be available to manage and control storage operations for client 185, and thus it may be migrated to storage operation cell 170. Because of the addition of media agent 206 and secondary storage media 227 (and/or, in alternative implementations, secondary storage media 211) into storage operation cell 170, HSM components may be added to storage manager 195 to allow for HSM operations, including collection and reporting of HSM data.

To further reduce the consumption rate of storage media 219, client 244 may be migrated to storage operation cell 175. Because media agent 212 is associated with client 244, it may be migrated to storage operation cell 175 with client 244 without requiring migration of other clients connected thereto, and without requiring any migration of databases (e.g., indexes) that media agent 212 would maintain for such other clients. In alternative implementations, a media agent already located in storage operation cell 175 may be assigned to client 244, or a new media agent for client 244 may be installed and configured in storage operation cell 175. In either case, storage preferences, storage policies or other preferences provided for a storage operation cell, media agent or other component of a storage operation cell may be retained by the resource or component after migration to a target storage operation cell, or alternatively the preference may be overwritten with new preferences associated with the target storage operation cell.

Accordingly, it will be understood that the ability to migrate or transfer resources across storage operation cells provides for greater flexibility in solving load balancing problems, providing robust failover solutions, and providing means by which systems efficiency may be monitored and improved providing, for improved performance, reliability, and resource utilization. Such load balancing or failover problems can be monitored and remedied on a system-wide or global basis, as well as on an individual storage component or resource level.

Figure 5:
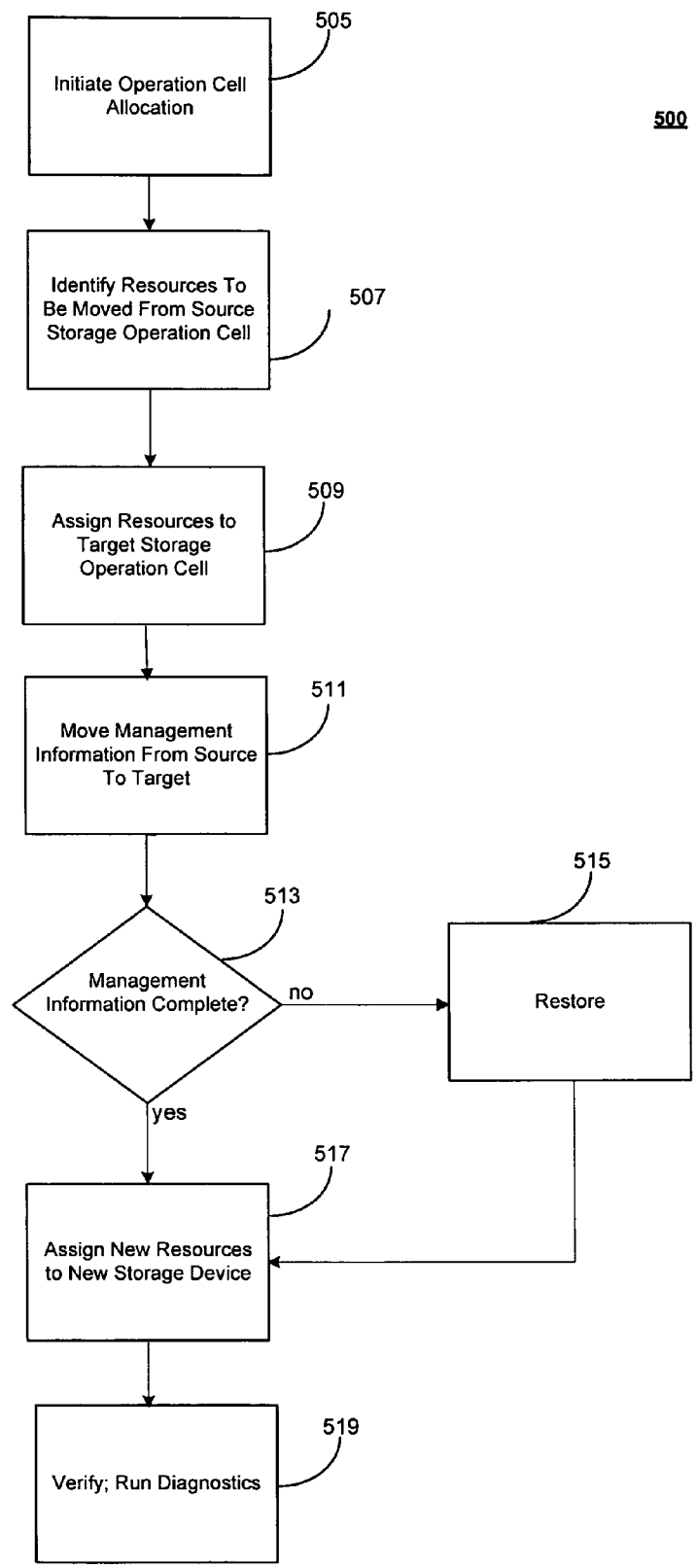
FIG. 5 is a flow diagram of a method for migrating one or more resources from one storage operation cell to another, according to an embodiment of the invention.

Referring now to FIG. 5, a flow chart illustrating some of the steps for migrating one or more resources from a source storage operation cell to a target storage operation cell is provided in accordance with an embodiment of the present invention. As noted above, resource migration may be implemented or initiated according to a process including any of the following: (1) one or more steps executed automatically in response to user input; (2) one or more steps executed automatically without user input in accordance with certain system operating policies or guidelines; or (3) one or more manually executed steps with certain steps occurring automatically. It will be understood that the process described with reference to FIG. 5 is merely illustrative, and that each operation or series of operations may be implemented automatically, manually, or a combination thereof.

For example, a user may initiate the resource migration process by interacting via a GUI (or other user interface) with a network resource management system that provides information and functions for storage operation cell resource allocation (step 505). Resource management may be implemented as one or more software modules or applications that may be integrated with, or be a component of, for example, the HSM and/or SRM software. At least some of the information monitored or generated by the HSM and/or SRM components, or other storage manager components may be used by the network resource management system for allocating or migrating resources. For instance, corrective actions recommended by the HSM component may be used by the resource management system in determining whether migration of a resource to another storage operation cell should be recommended.

In another example, a storage manager or other system component may receive information relating to, or may periodically query storage operation cell or system resources, or consult an index or database or storage policy regarding storage operation cell or system resources to determine current and future scheduled storage operation cell and resource utilization, and initiate the resource migration process, (step 505). Such periodic resource query may be the system checks or tests described in commonly owned U.S. patent application Ser. No. 11/269,513, titled SYSTEM AND METHOD FOR MONITORING A STORAGE NETWORK, filed Nov. 7, 2005. Thus, a storage manager or other system component may determine current and/or predicted resource needs or requirements for a storage operation cell, for example, based on a storage policy or other information and allocate storage operation cell resources accordingly.

The network resource management system, such as a storage manager component, or other component, may identify one or more resources to be moved or migrated from a given storage operation cell based, for example, on system operating conditions, user preference, and/or combination of the two, which may include additional forecasting or provisioning analysis (step 507). For instance, the network resource management system may provide information (e.g., component storage capacity, rate of storage media consumption, scheduled storage operations, network data pathway load metrics, processor loads, and other performance metrics) concerning resources (e.g., clients, media agents, primary or secondary storage media, data paths, or other components) within each of the storage operation cells. Alternatively, in the case where migration of resources is accomplished automatically, such information may be obtained by a storage manager, master storage manager or other system component to calculate performance metrics and determine and/or identify storage operation cell resources for migration. This may be performed on a substantially global basis, and a master storage manager component or other management component may analyze operations of the storage operation cells in a network and make recommendations and/or suggestions for resource migration based on this information (e.g., based on certain system optimization or data routing, management, and movement algorithms, etc.).

Figure 6:
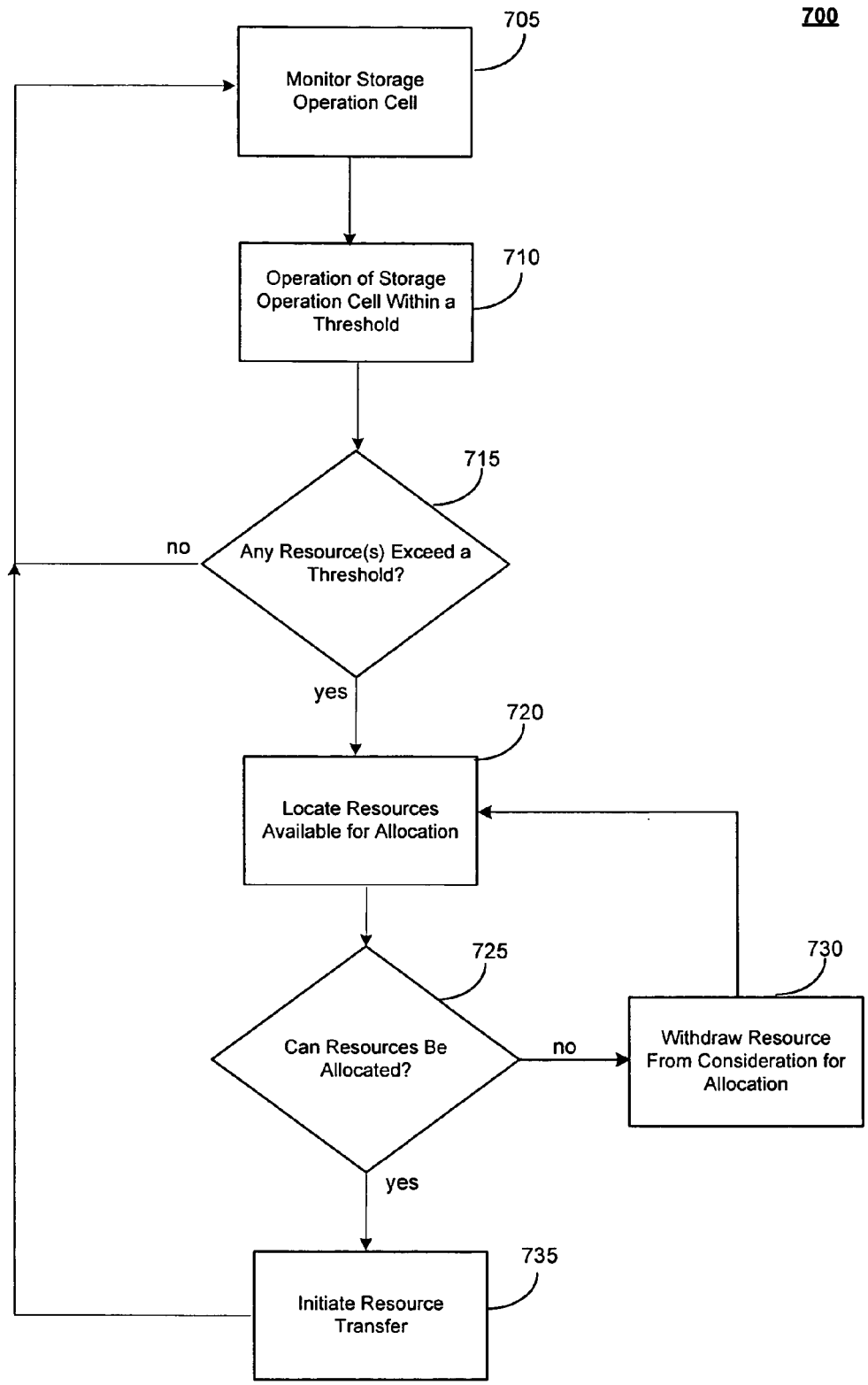
FIG. 6 is a flow diagram of a method for dynamic resource allocation, according to an embodiment of the invention.

The resource management system or storage manager may also generate alerts identifying operating conditions that require attention in the storage operation cells, such as a pathway or processor bottleneck, one or more storage operations that exceed a threshold relating to system performance which may be remedied by resource reallocation (e.g., as further described in FIG. 6). The network resource management system or storage manager may also recommend the migration or reallocation of specific resources, and may also identify one or more potential target locations (within or without the source storage operation cell) for the migration or reallocation. This may occur, for example, in recognition of impending hardware, software, or other system failures, such the network may be may correct problems, prior to occurrence to maintain or preserve system operation and data protection criteria and/or prevent service degradation (e.g., a "self-healing" capability in view of identified and impending component failures).

The alerts and/or recommendations for migrating one or more resources generated by various storage managers (or other storage components) may be based on analysis of certain information (e.g., storage capacity, rate of storage media consumption, data path load metrics, and other performance metrics or other system diagnostics) concerning resources (e.g., clients, media agents, secondary storage media, data paths) within its storage operation cell including existing configurations of the storage operation cell, schedule policy or other preferences in advance of a storage operation.

Additionally or alternatively, the network resource management system may itself analyze information received or acquired directly or indirectly from the storage managers. For instance, such information from each storage operation cell may be stored on a globally accessible database. In a hierarchical configuration, such as shown in FIG. 3, this information from each storage operation cell may be communicated to, and stored in the database of, the master storage manager. The network resource management system may then access and analyze this information to identify situations for which resource migration, or other corrective or preventative actions, may be recommended. Thus, the network resource migration system may facilitate identifying resources to be migrated. It will be understood, however, that in some situations the decision to migrate a resource across storage operation cells may be identified via the resource management system based on specific performance scenarios, configurations, resource characteristics or other basis.

Based on the information, alerts, or recommendations generated by the system, or based on other considerations, the user may select via the GUI (or other interface means) a resource located in a source storage operation cell for assignment or re-assignment to a specified target storage operation cell (step 509). In some embodiments, the selection may be made automatically by the system based on system operating conditions and metrics as determined by performance algorithms or other analysis software. In such an embodiment, the resource automatically selected may be identified as having appropriate utilization for migration to a target storage operation cell. Possible resources that may be selected include a client, a media agent, storage media, transmission resources and a datapath (i.e., a combination of media agent and storage media and transmission path used by the storage policy to perform a data protection operation), or other system component.

In some embodiments, prior to assigning a resource to a target storage operation cell, a storage manager or other system component may direct that storage operations be quiesced or temporarily ceased and that certain confirmatory test(s) be performed to verify that the anticipated or intended storage operations can be performed in the new proposed storage operation cell configurations before allowing the new storage operation cell configurations to be brought online. In some embodiments, when the storage operations are buffered or quiesced, a storage manager or other system component may observe the source and target storage operation cells and any components which may be associated or affected by the migrated resource to determine whether the migration is operating as anticipated.

In other embodiments, a storage manager or other system component may simulate the new resource configurations of the source and target storage operation cell in advance of the migration, to determine whether the configuration is desirable and likely to achieve the desired goal. The simulation may take into account existing information relating to each storage operation cell resource and storage operation scheduling or other job related information which may be obtained from a storage policy. This may include simulation of one or more proposed configurations by analysis or optimization software, and choosing the best one based on specified criteria through the use of, for example, a selection algorithm (or user input).

The system may then provide for moving management information associated with each selected resource (and stored in the source storage operation cell storage manager) from the source storage manager to the target storage manager (step 511). This may include any management information associated with the migrated resource such as index information associated with a media management component, metadata associated with the resource or other information. The communication of this information may occur, for example, directly between storage managers of the source and target storage operation cells, or indirectly through one or more intermediary storage managers, which may include a master storage manager.

In some embodiments, a copy of all or part of the management information may be physically transferred to the target storage manager. By way of example, when migrating a client, the management information that is transferred to the target storage operation cell includes media records, archive records, application records, job history, source and target network pathway information and some or all storage policy criteria for that client.

The transfer of this information may be accomplished by first identifying or obtaining the information in the source storage operation cell, and copying the information, or merging the information in, to the target storage operation cell. This may include the techniques described in co-pending application entitled "Systems and Methods of Unified Reconstruction in Storage Systems", which claims priority from U.S. Provisional Application 60/752,202, filed Dec. 19, 2005, both of which are hereby incorporated by reference in their entirety.

In some embodiments, to identify or obtain this information, the system may create a folder or other destination into which the system stores the information. Then, the target storage operation cell may be confirmed and any other designations that may be required by the system depending on the resource being transferred and/or the target storage operation cell. For example, in migrating a client, it may be required to designate a library and a media agent in the target storage operation cell corresponding to a given storage policy. The system may merge the information stored in the folder into the storage manager of the target storage operation cell.

In some embodiments, the management information may be stored to a storage manager database or index. For example, metadata or index information relating to the resource being migrated may be copied to a corresponding media management component in the target storage operation cell. This allows the media management component such as a storage manager, media agent or other component in the target storage operation cell to properly to manage and interoperate with the transferred resource in the same or similar manner as in the source storage operation cell. This typically includes associating the management information with the new storage operation cell and associated components and resources, etc., to ensure interoperation. As mentioned above, the migrated resource (e.g., the client or other component) may be configured to use the storage manager of the target storage operation cell. This resource configuration may occur, for example, prior to transferring the management information in step 511.

In the event that the management information is incomplete, or there is an inconsistency or other failure between management information stored by the resource and that stored by the storage manager (step 513), then a restore operation may be performed, such as an incremental restore operation. The restore operation may be implemented in an incremental order, accessing the data and metadata stored on one or more storage media (e.g., from one or more jukeboxes) to restore the data and metadata in reverse time order, thus restoring the metadata in the target storage operation cell (e.g., the metadata stored in the storage manager as well as in clients and/or media agents). As such, information relating to the incremental order may be obtained and restored, (step 515). However, other restore methods may be used, if desired, such as by use of copying data blocks from other locations, checking pointers to resources or other components, according to the method described in co-pending commonly owned U.S. Provisional Patent Application Ser. No. 60/752,202, SYSTEMS AND METHODS FOR UNIFIED RECONSTRUCTION OF DATA IN A STORAGE NETWORK filed Dec. 19, 2005, and its corresponding utility application 25963/012.

Once the management information is received by the target storage operation cell and the transferred resource has been configured with respect to its new location (i.e., other resources configured to interoperate with the transferred resource as contemplated) the target storage manager, the transferred resource may be assigned to one or more storage devices (step 517) by specifying, for example, particular mount paths, network pathways, and/or storage media. The assignment may include logically associating one or more pathways and the migrated resource and may be based on past or predicted performance of resources. Such associations may be stored in an index and may be provided using pointers or other methods.

The system may perform certain diagnostics to verify the resource migration configuration is as intended and check for errors (step 519). In some embodiments, diagnostics or storage operation cell configuration simulation may be performed on the source and/or target storage operation cell in advance of performing a storage operations on the source or target storage operation cells. This may be done to confirm that the resource migration was successful or to identify problems that may be present in the new configurations (and if identified, take steps to address or repair such problems).

Simulations of new configurations may include calculating known characteristics of a migrated resource and other storage operation cell resources together with metrics relating to storage operations to provide a confidence factor that may indicate whether the new configuration will provide the intended benefit. Based on one or more configuration confidence factors, a highest scoring configuration may be selected to be implemented. In the event that a resource is migrated, and the storage manager or other system component determines that yet another configuration would provide enhanced storage performance, the storage manager may analyze this information and initiate the migration process in an iterative fashion.

In general, information, including optimization levels, confidence factors, performance improvement, and other information relating to storage operation cell migration is stored and tracked to provide ongoing metrics that may be used to optimize future storage operation cell configurations.

FIG. 6 is a flow chart illustrating some of the steps involved in providing dynamic resource allocation in accordance with certain embodiments of the present invention. As will be understood, this dynamic allocation procedure may be used for various dynamic reallocation of resources including, but not limited to, load balancing and/or failover configurations, predictive or corrective analysis reconfiguration, optimizations etc.

As shown, the operation of the resources in each storage operation cell may be monitored (step 705) by the system. For instance, the monitored information may include storage capacity, rate of storage media consumption, data path load metrics, and other performance metrics as further described herein. Such system monitoring may be automatic and established, for example, according to a user preference or default template defined by a system administrator setting forth performance or configuration requirements or preferences. The monitoring may be performed as described in commonly owned U.S. patent application Ser. No. 11/269,513, SYSTEM AND METHOD FOR MONITORING A STORAGE NETWORK, filed Nov. 7, 2005.

The system may compare or otherwise evaluate the operation of the resource with respect to one or more thresholds (step 710). The thresholds may be established in a storage policy, user preference or other preference as mentioned above. The comparison or evaluation may be based on individual comparisons of monitored metrics, indicia, and other parameters with respective individual thresholds. For example, a threshold for a secondary storage device may be a 70% utilization rate, above which additional media may be required to perform storage operations, or as another example, data path usage exceeding a particular capacity (e.g., 80%).

Alternatively, or additionally, comparisons or evaluations may be made based on a metric that is a function (e.g., a use specified weighted sum or average) of monitored quantities and/or other metrics, and which may characterize the overall operating level of an individual resource or the storage operation cell as a whole (e.g., risk of data loss). For example, media usage and predicated growth metrics may be used to determine whether a particular media library can be continued to be used. If, for example. A media library is within a certain time period of being fully utilized, based on media usage and growth metrics (e.g., 3 days), the system may generate a warning, request new media for the library, and determine alternate destinations, should the library become substantially fully utilized (e.g., 95% capacity).

In the event that the operation of any resource, or overall storage operation cell operation is within the preset thresholds, (step 715), storage operation cell monitoring may continue on a constant or periodic basis. At some point, the monitoring may indicate that a particular resource exceeds a certain threshold or criteria. The system may identify this resource as a potential resource to reallocate and/or identify other resources to allocate to the storage operation cell to remedy the condition causing the threshold to be exceeded. The potential resources for reallocation may be identified by determining whether resources in other storage operation cells for which the operating thresholds are not exceeded (e.g., underutilized resources) are available for migration (step 720). A list of such resources may be maintained by one or management components within the system and used to identify and consider which resources may be best be used to solve a particular problem. Moreover, a list of under utilized resources may be kept track of as a measure of the "reconfigurability" of system to adapt to changing conditions.

For example, if a client, secondary storage device, media agent or other resource in another storage operation cell is operating within a pre-set threshold or in accordance with a criteria, such resources may be available to migrate to the target storage operation cell which includes resources which exceed the preset thresholds. Resource information may be obtained by locating a pool of resources, querying a list of resources, comparing resources with job scheduling, storage policies or other information, pinging or otherwise communicating with resources to determine what resources may be underutilized or over utilized. Cell information may also be obtained by consulting a storage manager, storage manager index, media agent, or other system component.

Potential resource reallocations may also include resources physically located within or logically associated with the storage operation cell of the resource to be transferred. In the case that more than one potential reallocation is identified, the system prioritizes them based on considerations such as how well the resource needs can be satisfied, load balancing, data loss risk, as well as other conditions which may be defined in advance by the user.

The system may also determine whether other conditions or constraints exist that prevent allocation or transfer of the resource, (e.g., physical location, lack of communications paths, incompatible with one another, impending or actual hardware failure, etc.) (step 725). If the resource cannot be allocated to any of the identified potential target locations, then the system may remove the resource from consideration for migration (step 730). Alternatively, the system may alert a user of the condition and allow the user to review the status of the resources. Also, in advance of an automatic migration, the system may send an alert to an administrator for authorization to perform the resource transfer. The system may then return to step 720 to locate other available resources for allocation. and/or for permission to proceed. In other embodiments, the system may have been preauthorized and the migration may occur substantially automatically.

In some embodiments, the system may determine (at step 720) the potential optimization improvement obtained by transferring the resource. For example, a storage manager or other system component may simulate the operation of a target storage operation cell including a component or resource migrated from a located storage operation cell and the operation of the located storage operation cell without the migrated resource. Such simulation may include determining whether the migration will enhance or otherwise improve performance of storage operations and whether the new target and source storage operation cell configurations will continue to function appropriately. This may involve evaluation of certain system performance metrics such as growth rate of target, future scheduled jobs, routing, pathway and temporal constraints, etc. and simulate operation of proposed new configuration(s) for a certain period of time in the future to confirm the desired benefits, are in fact, likely to be achieved. Moreover, multiple such proposed configurations may be evaluated, with the m system (or user) selecting the most desirable option.

In the event that the resource can be transferred (step 730), the system may automatically initiate the transfer, (step 735), (e.g., identifying and copying data relating to the resource, merging the data and reconfiguring the resource, updating the index with new logical associations of the new configuration, etc.). Data relating to the resource transfer may be stored in a storage manager or media agent index or database. Following the resource transfer, the system may continue to periodically monitor the operation and resource utilization of the storage operation cells.

Figure 7:
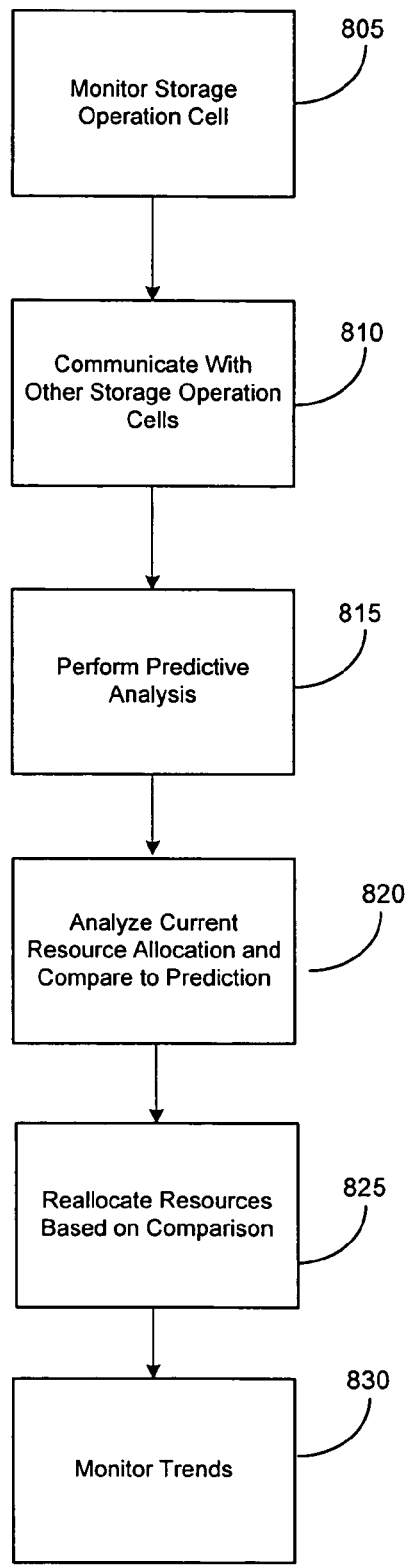
FIG. 7 is a flow diagram of a method for resource allocation based on predictive analysis, according to an embodiment of the invention.

In accordance with a further embodiment of the present invention, resource reallocation may be based on predictive and other analyses, as will be further understood in view of the illustrative operational flow shown in FIG. 7. As shown, at step 805, the operation of the resources in each storage operation cell may be monitored by the system. The monitored information may include monitoring trends or patterns such as those relating to storage capacity, rate of storage media consumption, data path load metrics, system congestion, data load with respect to time, or any other performance metrics of interest to a system operator. This information may be communicated among storage operation cells, and/or to a master storage manager or other globally accessible location (step 810).

The monitored information may be used to perform predictive analysis type operations on a resource, storage operation cell, and/or network wide basis (step 815). Predictions may relate to individual monitored parameters or metrics, or functions thereof, and may involve load analysis, level of data protection, risk criteria of a storage characteristics, cost of storing data, data availability, or other indicia or metrics concerning the resources or the state of storage operations in one or more storage operation cells. In some embodiments, the predictive analysis may be performed according to user, department, project, or other identifier. Such predictions may be performed in order to identify and correct resource shortages and/or system inefficiencies prior to their occurrence.

In operation, a user may interact with the system via the GUI (or other interface) to specify and perform a desired analysis, and access and/or generate reports for trends concerning resource allocation. In some embodiments, the user may specify alternative configurations of the resources and perform a predictive analysis for such alternative configurations based on the monitored information for the resources in the current configuration. In some embodiments, the predictive analysis is performed automatically, for example according to user pre-defined analysis; a storage policy; or other preference. Simulations of storage operation cell operations and/or configurations may also be tracked and used to optimize future storage operation cell operations and/or configurations.

Trends and patterns obtained in the predictive analysis may be used together with other information such as storage policy information to determine future resource use required to perform storage operations according to the storage policy and to prevent resource exhaustion, overuse and system inefficiencies. For example, the system may predict, based on growth trends within a certain storage operation cell, the need for additional media agents, storage media, transmission paths or other resources (e.g., within a certain time frame). Such resources may be migrated from one storage operation cell to another prior to a lack or overuse of such resources becomes problematic in a given cell. For example, the system may predict an impending shortage of storage media within a certain storage operation cell. The system may consider various options for solving this problem and choose the optimal solution (including adding additional media to existing storage devices). This may involve migrating certain storage devices into the storage operation cell to help alleviate the predicted impending shortage of storage media.

Another example involves migrating additional media agents or data paths to a storage operation cell to help prevent bottlenecks or congestion conditions that may be predicted based on current growth or operational trends. For example, the system may predict media agent utilization will exceed a predefined utilization threshold based on client or data growth. In addition to considering other options, the system may locate and migrate (or prepare to migrate) additional media agents and reconfigure associated transmission paths to help alleviate this problem prior to its occurrence or before reaching certain level of severity.

Another scenario involves the case where device or component failure rates are trending above acceptable limits (e.g., for media agent hosts, storage manager hosts, storage devices, storage media, etc.). The system may recognize this emerging problem and reassign certain resources such as clients and/or media agents to other transmission paths to minimize this problem, or the potential for this problem. The system may also keep track of certain system configuration and operational information regarding system components such as hardware type, expected lifespan (in various configurations), current deployment time etc. This information may be evaluated to determine the likelihood of failure and system reconfiguration and/or device replacement recommendations or actions may be made based on this information. This may be accomplished using the systems and methods described in co-pending U.S. patent application Ser. No. 11/120,619, HIERARCHICAL SYSTEMS AND METHODS FOR PROVIDING STORAGE A UNIFIED VIEW OF STORAGE INFORMATION, filed May 2, 2005, and U.S. Patent Application Ser. No. 60/752,197 titled SYSTEMS AND METHODS FOR HIERARCHICAL CLIENT GROUP MANAGEMENT, filed Dec. 19, 2005, both of which are incorporated herein by reference.

Moreover, the system may monitor client growth in order to predict a point in time when it is desirable to split a storage operation cell into two or more storage operation cells or, alternatively when it may be desirable to combine multiple storage operation cells into one storage operation cell. For example, a storage operation cell may be split into multiple storage operation cells once the number of clients and/or media agent reach a certain threshold point. This point may be determined by certain utilization thresholds set as part of user preferences or system requirements, or may be based on bandwidth of computational abilities of such resources (e.g., predicted inability to or certain resources to handle operations with a certain time frame, etc.).

In operation, the system may recognize the need to split storage operation cells and create additional storage operation cells and migrate the appropriate resources into those storage operation cells as described above. Similarly, one or storage operation cells may be combined into a single storage operation cell once resource utilization falls below a certain threshold level. Such consolidation may also occur in the event of physical relocation or reallocation of certain resources to promote the efficient grouping or configuration of resources within the system.

Thus, the system may determine the future resources and future storage operation cell configurations required to perform storage operations and compare the resource requirement and storage operation cell configuration to a current resource allocation (step 820), such as existing components associated in one or more storage operation cells. Based on the comparison, resources may be reallocated, (e.g., migrated from a source storage operation cell to a target storage operation cell), either automatically by the system or in response to user specified reallocation, and/or a need for further modifications and/or enhancements to the storage network may be established (step 825). After the resources have been reallocated, the system may monitor trends in storage characteristics so that the trend or pattern predictive information may be dynamically updated accordingly and used to configure storage operation cell configurations on an ongoing basis a described herein (step 830). Accordingly, the system according to one embodiment is able to continuously maintain an optimized and/or fail-safe storage system even as over time the system changes in its usage, resources, capacity, setup etc.

Moreover, as mentioned above, resources or data may be migrated from one storage operation cell to another (existing or new) storage operation cell on a temporary or permanent basis. For example, in disaster recovery or other failure scenario, if one or more storage operation cells are experiencing failures, or have lost or are in jeopardy of losing power or will otherwise become unable to continue normal operation because of loss of resources or communications links (e.g., impending natural disaster), the system may create a storage operation cell and migrate resources to that storage operation cell on a temporary basis such that the resources may be returned or otherwise reallocated at some point in the future once the problem has been corrected.

As another example, assume a certain storage operation cell has lost power and its resources are currently operating with a backup power supply such as a UPS (uninterruptible power supply). The system may be able to operate for only a limited period of time based on the UPS power. The system may recognize the problem, and create a temporary storage operation cell and migrate clients and data from the storage operation cell that has lost power to the temporary storage operation cell. Such a migration may be scheduled to be substantially complete before the UPS runs out of power. This allows data and other system operations to continue to operate substantially uninterrupted until power can be restored to the original storage operation cell. At this point, data and storage operation cell resources may be returned to the original storage operation cell. In some embodiments, certain resources may be assigned to such temporary storage operation cells to act as a failover storage operation cell in such situations. This may be done to ensure data protection and system robustness even if certain storage operation cells are rendered inoperable by unforeseen or uncontrollable circumstances.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as know in the art to input, access, change, manipulate, modify, alter, and work with information. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above as such variations and modification are intended to be included within the scope of the invention.

What is claimed is:

1. A method for automatically transferring a storage resource from a first storage operation cell to a second storage operation cell, the method comprising:
    monitoring, with a first storage operation cell, primary data created by one or more client computers, the primary data stored on one or more primary storage devices, the first storage operation cell comprising at least a first storage manager and at least a first media agent;
    directing the first media agent to backup at least a first portion of the primary data by copying the first portion of the primary data to one or more secondary storage devices to create secondary data of the primary data, and wherein the first media agent creates a first index of the secondary data;
    monitoring, with a second storage operation cell, the primary data created by the one or more client computers, the second storage operation cell comprising at least a second storage manager and a second media agent;
    directing the second media agent to backup at least a second portion of the primary data by copying the second portion of the primary data to the one or more secondary storage devices to create the secondary data of the primary data, and wherein the second media agent creates a second index of the secondary data;
    monitoring a first operational characteristic of the first media agent in the first storage operation cell wherein the first operational characteristic has an associated first threshold;
    predicting future utilization of the first media agent based on monitoring the first operational characteristic of the first media agent;
    identifying that the second storage operation cell comprises a second storage resource having a second operational characteristic that does not exceed a second threshold;
    determining whether the first media agent may be transferred to the second storage operation cell such that the transfer is capable of causing the first operational characteristic to remain within the first threshold; and
    automatically transferring the first media agent to the second storage operation cell if predicting future utilization of the first media agent is near or exceeds the first threshold,
    reconstituting the first media agent and the first index in the second storage operation cell;
    wherein the second storage operation cell directs the first media agent to backup the first portion of the primary data and update the first index.

2. The method of claim 1, wherein the first operational characteristic is representative of a distribution of storage operations within the first storage operation cell.

3. The method of claim 2, wherein the transfer of the first media agent to the second storage operation cell promotes a substantially uniform distribution of storage operations within the first storage operation cell.

4. The method of claim 3, wherein load balancing is accomplished, at least in part, by the substantially uniform distribution of data transmission tasks.

5. The method of claim 1, wherein the first operational characteristic is representative of storage media consumption.

6. The method of claim 5, wherein the transfer of the first media agent to the second storage operation cell reduces storage media consumption.

7. The method of claim 1, further comprising transferring a secondary storage device to the second storage operation cell to reduce the likelihood of storage media exhaustion.

8. The method of claim 1, wherein the first operational characteristic is representative of overall system performance.

9. The method of claim 8, wherein the transfer of the first media agent to the second storage operation cell improves system efficiency.

10. The method according to claim 1, further comprising automatically transferring management information associated with the first media agent from the first storage operation cell to the second storage operation cell when the first media agent is transferred.

11. The method of claim 1, further comprising monitoring at least one operational characteristic of the first storage operation cell after transferring the first media agent .

12. The method of claim 11, further comprising transferring the first media agent back to the first storage operation cell if the at least one operational characteristic of the first storage operation cell indicates an undesirable impact in the operation of the first storage operation cell after transferring the first media agent.

13. The method of claim 1, further comprising monitoring at least a second operational characteristic associated with the second storage operation cell after transferring the first media agent.

14. The method of claim 13, further comprising transferring the first media agent back to the first storage operation cell if the second operational characteristic of the second storage operation cell indicates an undesirable impact in the operation of the second storage operation cell after transferring the first media agent.

15. The method according to claim 1, further comprising quiescing the first media agent before transferring the first media agent to the second storage operation cell.

16. The method according to claim 1, further comprising verifying that the second storage operation cell can accept the first media agent prior to transferring the first media agent to the second storage operation cell.

17. The method according to claim 16, wherein the verifying further comprises simulating the performance of the first media agent in the second storage operation cell.

18. The method according to claim 1, wherein the verifying further comprises simulating the performance of the first storage operation cell without the first media agent in the second storage operation cell.

19. The method according to claim 1, wherein:
predicting future utilization is based on an operational trend; and
determining whether to transfer the first media agent to the second storage operation cell based on the operational trend.

20. The method according to claim 1, wherein the first and second operational characteristics are anyone of the following: network bandwidth utilization, resource capacity used, resource capacity available, time periods between storage operations, scheduling conflicts, or transmission path loads.

21. The method according to claim 1, further comprising before transferring the first media agent to the second storage operation cell, analyzing and predicting at least one effect on operational characteristics of the first or second storage operation cell if the first media agent is transferred.

22. The method according to claim 1, further comprising sending an alert to a user that the first media agent has been transferred.

23. The method of claim 1, wherein the automatically transferring step is performed, independent of user input, in response to at least one of system operating policies or guidelines.

24. The method according to claim 1, further comprising permanently transferring the first media agent to the second storage operation cell.

* * * * *